(12) United States Patent
Serret-Avila

(10) Patent No.: US 8,762,711 B2
(45) Date of Patent: *Jun. 24, 2014

(54) SYSTEMS AND METHODS FOR AUTHENTICATING AND PROTECTING THE INTEGRITY OF DATA STREAMS AND OTHER DATA

(75) Inventor: Xavier Serret-Avila, Santa Clara, CA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 278 days.

This patent is subject to a terminal disclaimer.

(21) Appl. No.: 13/018,274

(22) Filed: Jan. 31, 2011

(65) Prior Publication Data

US 2011/0126084 A1   May 26, 2011

Related U.S. Application Data

(63) Continuation of application No. 12/038,664, filed on Feb. 27, 2008, now Pat. No. 7,882,351, which is a continuation of application No. 11/112,520, filed on Apr. 22, 2005, now Pat. No. 7,340,602, which is a continuation of application No. 09/543,750, filed on Apr. 5, 2000, now Pat. No. 6,959,384.

(60) Provisional application No. 60/170,828, filed on Dec. 14, 1999.

(51) Int. Cl.
*H04L 29/06* (2006.01)

(52) U.S. Cl.
USPC ............................................. 713/161; 713/176

(58) Field of Classification Search
USPC .................................................. 713/161, 176
See application file for complete search history.

(56) References Cited

U.S. PATENT DOCUMENTS 4,218,582 A   8/1980   Hellman et al.
4,309,569 A   1/1982   Merkle
(Continued)

FOREIGN PATENT DOCUMENTS

EP   0 715 247 A1   6/1996
WO   WO 96/27155   9/1996
(Continued)

OTHER PUBLICATIONS

Applied Cryptography, Schneier pp. 433, 434, 1996.*
(Continued)

*Primary Examiner* — Christopher Brown
(74) *Attorney, Agent, or Firm* — Finnegan, Henderson, Farabow, Garrett & Dunner LLP

(57) ABSTRACT

Systems and methods are disclosed for enabling a recipient of a cryptographically-signed electronic communication to verify the authenticity of the communication on-the-fly using a signed chain of check values, the chain being constructed from the original content of the communication, and each check value in the chain being at least partially dependent on the signed root of the chain and a portion of the communication. Fault tolerance can be provided by including error-check values in the communication that enable a decoding device to maintain the chain's security in the face of communication errors. In one embodiment, systems and methods are provided for enabling secure quasi-random access to a content file by constructing a hierarchy of hash values from the file, the hierarchy deriving its security in a manner similar to that used by the above-described chain. The hierarchy culminates with a signed hash that can be used to verify the integrity of other hash values in the hierarchy, and these other hash values can, in turn, be used to efficiently verify the authenticity of arbitrary portions of the content file.

9 Claims, 21 Drawing Sheets

(56) References Cited

U.S. PATENT DOCUMENTS

| | | | |
|---|---|---|---|
| 4,827,508 | A | 5/1989 | Shear |
| 4,977,594 | A | 12/1990 | Shear |
| 5,050,213 | A | 9/1991 | Shear |
| 5,373,561 | A | 12/1994 | Haber et al. |
| 5,410,598 | A | 4/1995 | Shear |
| 5,530,235 | A | 6/1996 | Stefik et al. |
| 5,534,975 | A | 7/1996 | Stefik et al. |
| 5,629,980 | A | 5/1997 | Stefik et al. |
| 5,634,012 | A | 5/1997 | Stefik et al. |
| 5,638,443 | A | 6/1997 | Stefik et al. |
| 5,715,403 | A | 2/1998 | Stefik |
| 5,835,595 | A * | 11/1998 | Fraser et al. ............... 713/169 |
| 5,892,900 | A | 4/1999 | Ginter et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,920,861 | A | 7/1999 | Hall et al. |
| 5,940,504 | A | 8/1999 | Griswold |
| 5,943,422 | A | 8/1999 | Van Wie et al. |
| 5,949,876 | A | 9/1999 | Ginter et al. |
| 5,982,891 | A | 11/1999 | Ginter et al. |
| 5,999,949 | A | 12/1999 | Crandall |
| 6,009,176 | A * | 12/1999 | Gennaro et al. ............ 713/170 |
| 6,112,181 | A | 8/2000 | Shear et al. |
| 6,138,119 | A | 10/2000 | Hall et al. |
| 6,157,721 | A | 12/2000 | Shear et al. |
| 6,185,683 | B1 | 2/2001 | Ginter et al. |
| 6,237,786 | B1 | 5/2001 | Ginter et al. |
| 6,240,185 | B1 | 5/2001 | Van Wie et al. |
| 6,253,193 | B1 | 6/2001 | Ginter et al. |
| 6,292,569 | B1 | 9/2001 | Shear et al. |
| 6,363,488 | B1 | 3/2002 | Ginter et al. |
| 6,389,402 | B1 | 5/2002 | Ginter et al. |
| 6,427,140 | B1 | 7/2002 | Ginter et al. |
| 6,449,367 | B2 | 9/2002 | Van Wie et al. |
| 6,618,484 | B1 | 9/2003 | Van Wie et al. |
| 6,640,304 | B2 | 10/2003 | Ginter et al. |
| 6,658,568 | B1 | 12/2003 | Ginter et al. |
| 6,668,325 | B1 | 12/2003 | Collberg et al. |
| 6,785,815 | B1 | 8/2004 | Serret-Avila et al. |
| 6,832,316 | B1 | 12/2004 | Sibert |
| 6,938,021 | B2 | 8/2005 | Shear et al. |
| 6,948,070 | B1 | 9/2005 | Ginter et al. |
| 6,950,867 | B1 | 9/2005 | Strohwig et al. |
| 6,959,384 | B1 | 10/2005 | Serret-Avila |
| 6,961,854 | B2 | 11/2005 | Serret-Avila et al. |
| 2001/0042043 | A1 | 11/2001 | Shear et al. |
| 2002/0023214 | A1 | 2/2002 | Shear et al. |
| 2002/0048369 | A1 | 4/2002 | Ginter et al. |
| 2002/0087859 | A1 | 7/2002 | Weeks et al. |
| 2002/0112171 | A1 | 8/2002 | Ginter et al. |
| 2002/0152173 | A1 | 10/2002 | Rudd |
| 2003/0023856 | A1 | 1/2003 | Horne et al. |
| 2003/0041239 | A1 | 2/2003 | Shear et al. |
| 2003/0046244 | A1 | 3/2003 | Shear et al. |
| 2003/0069748 | A1 | 4/2003 | Shear et al. |
| 2003/0069749 | A1 | 4/2003 | Shear et al. |
| 2003/0084003 | A1 | 5/2003 | Pinkas et al. |
| 2003/0105721 | A1 | 6/2003 | Ginter et al. |
| 2003/0163431 | A1 | 8/2003 | Ginter et al. |
| 2004/0054630 | A1 | 3/2004 | Ginter et al. |
| 2004/0059951 | A1 | 3/2004 | Pinkas et al. |
| 2004/0073813 | A1 | 4/2004 | Pinkas et al. |
| 2004/0103305 | A1 | 5/2004 | Ginter et al. |
| 2004/0107356 | A1 | 6/2004 | Shamoon et al. |
| 2004/0123129 | A1 | 6/2004 | Ginter et al. |
| 2004/0133793 | A1 | 7/2004 | Ginter et al. |
| 2005/0027871 | A1 | 2/2005 | Bradley et al. |
| 2005/0050332 | A1 | 3/2005 | Serret-Avila et al. |
| 2005/0060560 | A1 | 3/2005 | Sibert |
| 2005/0060584 | A1 | 3/2005 | Ginter et al. |
| 2005/0108555 | A1 | 5/2005 | Sibert |

FOREIGN PATENT DOCUMENTS

| | | |
|---|---|---|
| WO | WO 97/43761 | 11/1997 |
| WO | WO 98/09209 | 3/1998 |
| WO | WO 98/10381 | 3/1998 |
| WO | WO 98/37481 | 8/1998 |
| WO | WO 99/01815 | 1/1999 |
| WO | WO 99/24928 | 5/1999 |
| WO | WO 99/48296 | 9/1999 |
| WO | WO 00/75925 | 12/2000 |
| WO | WO 01/06374 | 1/2001 |
| WO | WO 01/09702 | 2/2001 |
| WO | WO 01/10076 | 2/2001 |

OTHER PUBLICATIONS

Final Office Action dated Dec. 4, 2006 issued in related application U.S. Appl. No. 11/112,520, filed Apr. 22, 2005, Serret-Avila.

Gennaro, Rosario et al., How to Sign Digital Streams, Advances in Cryptology—CRYPTO '97 (Aug. 17-21, 1997), vol. 1294 of Lecture Notes, Springer-Verlag, 1998, pp. 180-197.

Haber, Stuart., et al., How to Time-Stamp a Digital Document, Advances in Cryptology Applications, Proceedings of the Twenty First Annual ACM Symposium on Theroy of Computing (May 15-17, 1989) ACM Press, 1989, pp. 33-43.

Menezs, Alfred J. et al., Chapter 11: Handbook of Applied Cryptography, CRC Press, 1997, pp. 425-488.

Meners, Alfred J. et al., Chapter 9: Hash Functions and Data lntergrity, Handbook of Applied Cryptography, CRC Press, 1997, pp. 321-383.

Naro, Moni et al, Universal One-Way Hash Functions and their Cryptographic Applications, Proceedings of the Twenty First Annual ACM Symposium on Theory of Computing (May 15-17), ACM Press.

Notice of Allowance dated Feb. 28, 2005, issued in related application U.S. Appl. No. 09/543,750, filed Apr. 5, 2000, Xavier Serret-Avila.

Notice of Allowance dated Oct. 9, 2007 issued in related application U.S. Appl. No. 11/112,520, filed Apr. 22, 2005, Serret-Avila.

Office Action dated Mar. 28, 2006, issued in related application U.S. Appl. No. 11/112,520, filed Apr. 22, 2005, Serret-Avila.

Office Action dated May 12, 2004, issued in related application U.S. Appl. No. 09/543,750, filed Apr. 5, 2000, Xavier Serret-Avila.

Office Action dated May 15, 2007 issued in related application U.S. Appl. No. 11/112,520, filed Apr. 22, 2005, Serret-Avila.

Rohtagi, P., "A Compact and Fast Hybrid Signature Scheme for Multicase Packet Authentication", 6th ACM Conference on Computer and Communications Security, Nov. 1999, pp. 93-100.

Schneier, Bruce, "Applied Cryptography second edition" 1996, ISBN 0-471-11709-9, pp. 433, 434.

Sibert, Olin, et al. "Digibox: A Self-Protecting Container for Information Commerce," Proceedings of the First USENIX Workshop on Electronic Commerce, New York, NY, Jul. 1995, pp. 1-13.

Sibert, Olin, et al., "Securing the Content, Not the Wire, for Information Commerce," InterTrust Technologies Corporation, 1996, 12 pages.

Stefik, M., "Chapter 7, Classification," Introduction to Knowledge Systems, Morgan Kaufmann Publishers, Inc., 1995, pp. 543-607.

Stefik, M., "Letting Loose the Light: Igniting Commerce in Electronic Publication," Internet Dreams: Archetypes, Myths, and Metaphors. Massachusetts Institute of Technology, 1996, pp. 219-53.

Stefik, M., "Letting Loose the Light: Igniting Commerce in Electronic Publication," Xerox PARC, Palo Alto, CA, 1994-1995, 35 pages.

Stefik, M., "Trusted Systems," Scientific American, Mar. 1997, pp. 78-81.

Wong, C.K. et al., "Digital Signatures for Flows and Multicasts", Proceedings of IEEE ICNP 1998, 1998, 12 pages.

* cited by examiner

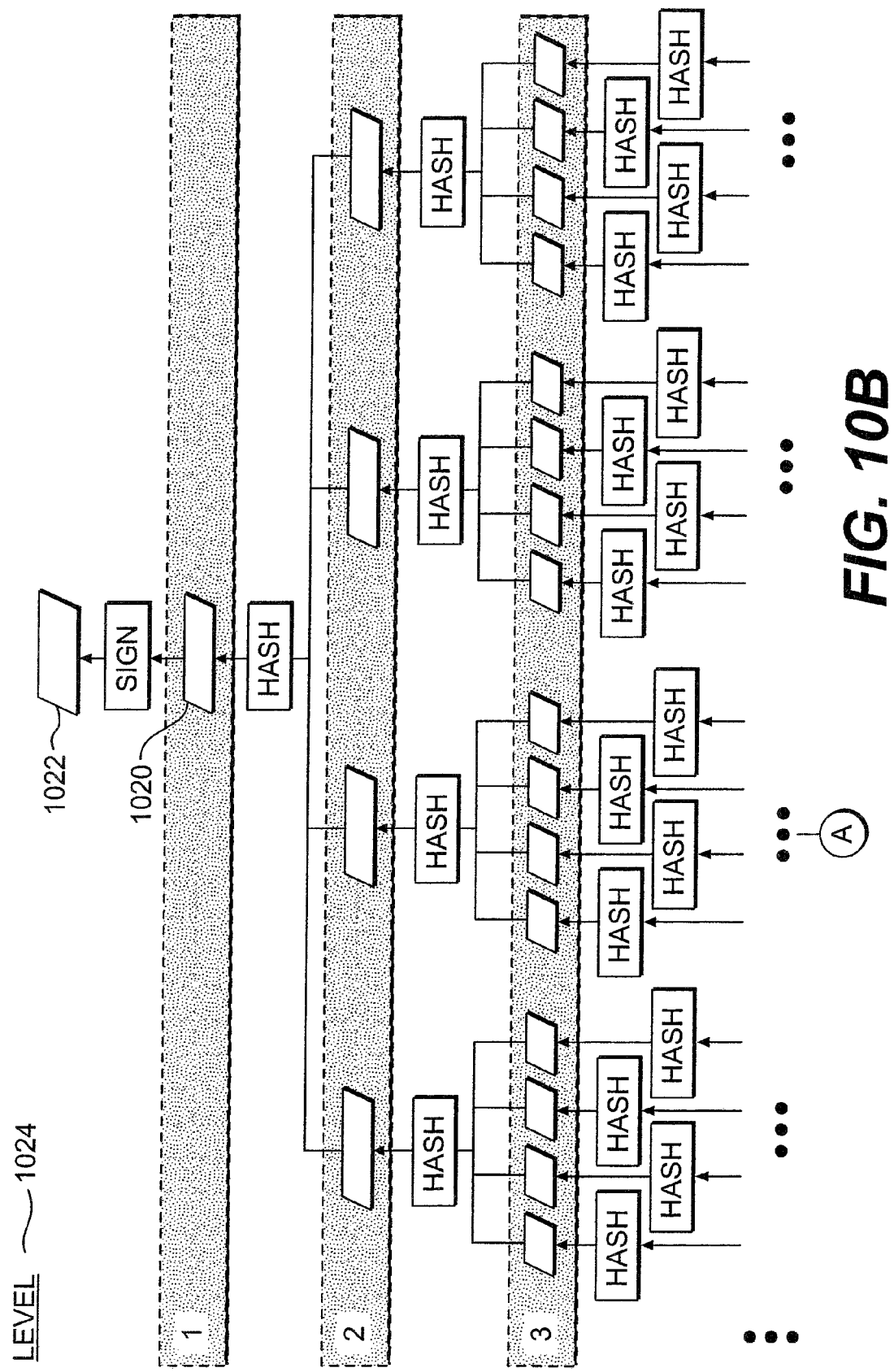

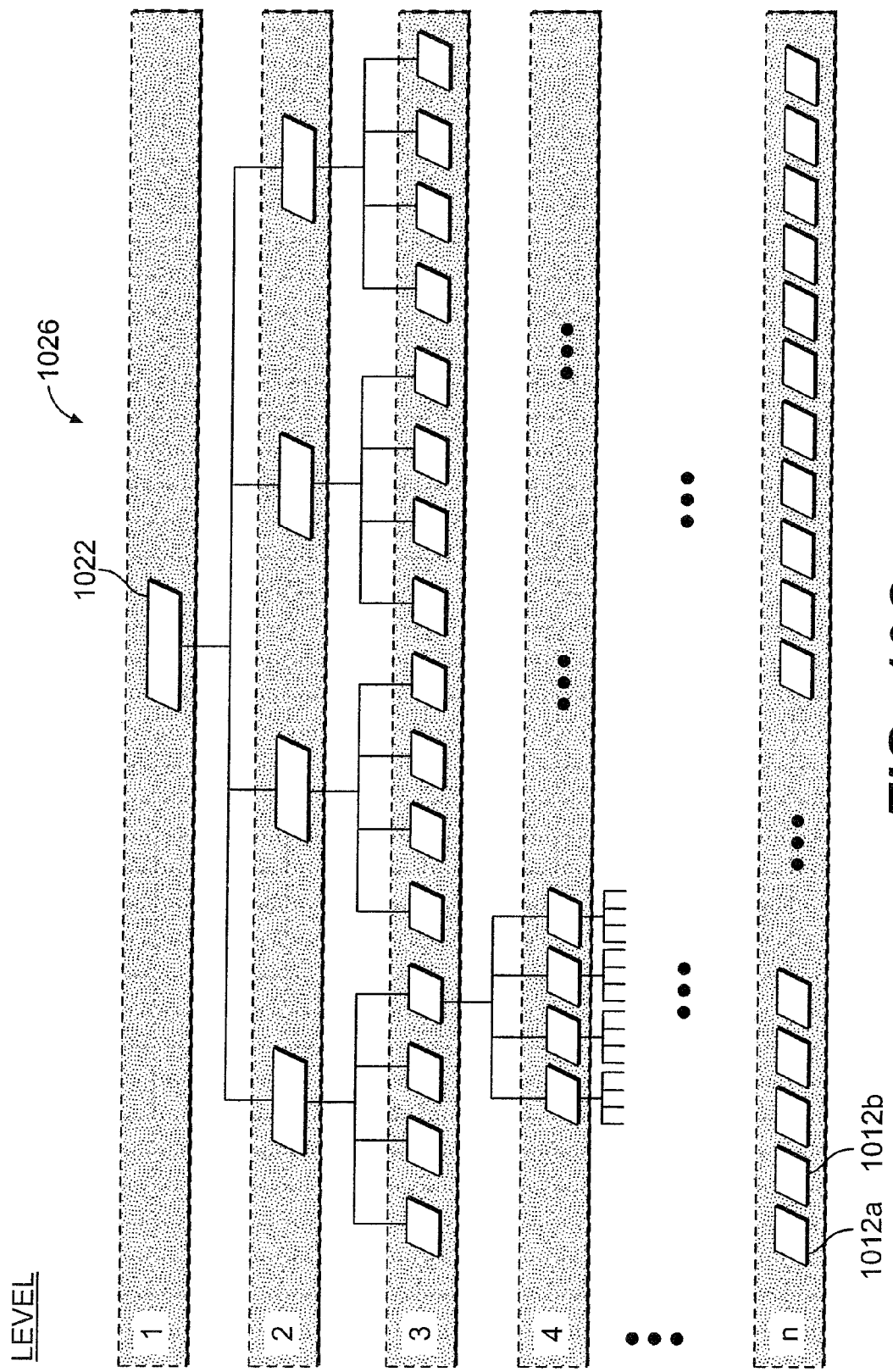

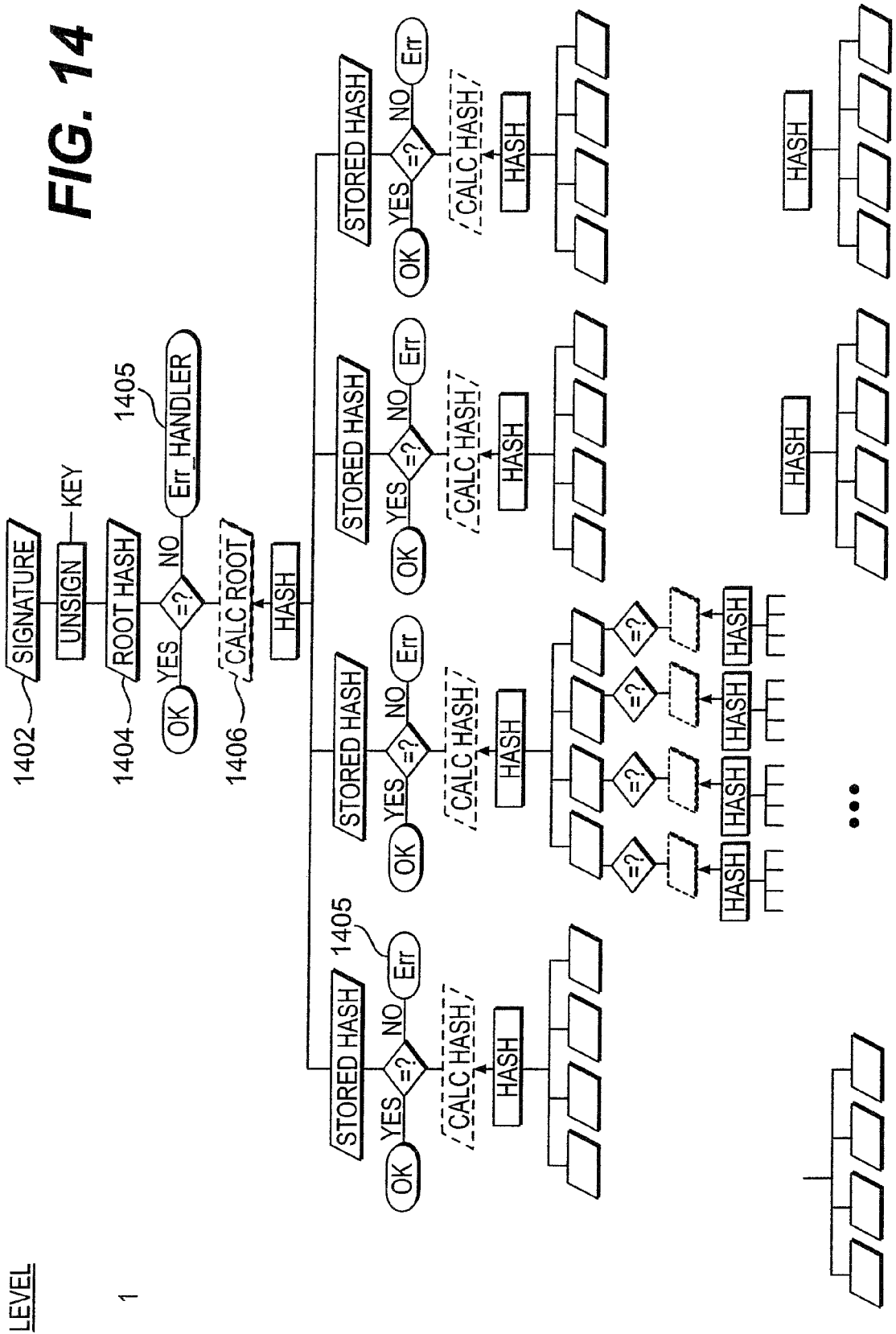

SYSTEMS AND METHODS FOR AUTHENTICATING AND PROTECTING THE INTEGRITY OF DATA STREAMS AND OTHER DATA

RELATED APPLICATIONS

This is a continuation of U.S. patent application Ser. No. 12/038,664, filed on Feb. 27, 2008 now U.S. Pat. No. 7,882,351, which is a continuation of U.S. patent application Ser. No. 11/112,520, filed on Apr. 22, 2005, now U.S. Pat. No. 7,340,602, which is a continuation of U.S. application Ser. No. 09/543,750, filed on Apr. 5, 2000, now U.S. Patent No. 6,959,384, which claims priority from U.S. Provisional Application No. 60/170,828, filed on Dec. 14, 1999, and is related to commonly-assigned U.S. Provisional Application No. 60/138,171, filed on Jun. 8, 1999, and commonly-assigned U.S. patent application Ser. No. 09/276,233, filed on Mar. 25, 1999, now U.S. Pat. No. 7,233,948, all of which are hereby incorporated by reference in their entireties.

COPYRIGHT AUTHORIZATION

A portion of the disclosure of this document contains material that is subject to copyright protection. The copyright owner has no objection to the facsimile reproduction of the patent document or the patent disclosure as it appears in the Patent and Trademark Office files or records, but otherwise reserves all copyrights whatsoever.

FIELD OF THE INVENTION

The present invention relates generally to the communication and storage of electronic data. More specifically, the present invention relates to systems and methods for authenticating and protecting the integrity of electronic information using cryptographic techniques.

BACKGROUND OF THE INVENTION

As electronic commerce grows in popularity, there is an increasing need for systems and methods that protect the rights and interests of the parties involved. One class of problems faced by those conducting transactions remotely via electronic communications networks such as the Internet is that of authenticating messages received from others and providing ways for others to authenticate one's own messages. For example, a party to an electronic transaction will typically want assurance that the other parties are who they purport to be. A party will also want to prevent attackers from misappropriating its identity by, e.g., forging its signature or otherwise assuming its identity in interactions with others. A related problem is that of verifying the integrity of an electronic communication—that is, verifying that the content of the communication has not been modified—when, due to transmission errors, malicious tampering, or a variety of other factors, this may not be the case.

A variety of authentication and validation schemes have been proposed, ranging from the use of passwords to the use of cryptographic signatures. In general, these schemes rely on the existence of a secret shared between the parties to a transaction. By demonstrating knowledge of the shared secret, the parties are able to authenticate themselves to one another. Many cryptographic signature schemes are based on public key cryptography. In public key cryptography, a party creates a signature by applying a strong cryptographic hash algorithm (e.g., SHA-1) to a plaintext message and encrypting the result with the party's private key. The signature message is often as big as the private key modulus, which is typically much larger than the output from the hash algorithm. To verify the signature, a recipient needs to obtain the full message, hash it, decrypt the signature using the signer's public key, and compare the decrypted signature with the hash of the message. If the computed hash is equal to the decrypted signature, then the message is deemed to be authentic.

FIGS. 1A and 1B illustrate the conventional signature generation and detection process described above. Referring to FIG. 1A, a hashing algorithm 102 is applied to a plaintext message 100 to yield a hash or message digest 104. A signature 105 is generated by encrypting message digest 104 using an encryption algorithm 106 and the sender's private key 108. Signature 105 is then transmitted to the recipient along with a copy of message 100. Although, for ease of explanation, FIG. 1A shows message 100 being sent to the recipient in unencrypted form, message 100 could be sent in encrypted form instead, if it were desired to maintain the confidentiality of the message.

Referring to FIG. 1B, the recipient of a message 100' and a signature 105' applies hash function 114 to message 100' to yield message digest 116. The recipient also decrypts signature 105' using the sender's public key 118 to yield message digest 120. Message digest 116 is then compared with message digest 120. If the two message digests are equal, the recipient can be confident (within the security bounds of the signature scheme) that message 100' is authentic, as any change an attacker made to message 100' or signature 105' would cause the comparison to fail.

A problem with the approach shown in FIGS. 1A and 1B is that the recipient must receive the entire message 100' before checking its authenticity. The recipient will thus need enough storage to hold the entire message, and must be willing to wait however long is needed to receive it. It is often impractical to meet these limitations. For example, audio, video, and multimedia files are often relatively large, and can thus take a long time to download. In addition, many consumer electronic devices for playing audio, video, or multimedia files have minimal storage and/or processing capacity. As a result, system designers will often wish to allow a consumer to begin using a file before it is completely downloaded, and/or without requiring the consumer's system to store or process the entire file at one time. Thus, for example, multimedia files comprised of multiple MPEG frames are typically designed to be processed on-the-fly by the consumer's device, each MPEG frame being processed while the next frame is received. This is commonly known as "streaming."

One way to adapt the traditional signature scheme described above for use with streaming applications is to break message 100 into subparts, and to sign each subpart separately. However, this approach has several drawbacks. For example, it can require a relatively large amount of processing power, since both the signature issuer and the signature verifier need to perform numerous relatively-costly public and/or private key operations. In addition, this approach is relatively costly in terms of bandwidth and/or storage requirements, as inserting a large number of cryptographic signatures into the stream can noticeably increase the stream's size. Yet another drawback of this approach is that it fragments the signed message into a set of unrelated, signed sub-messages. This can be less secure and more inconvenient than working with a single, atomic document, as it can be difficult, for example, to determine whether the sub-messages have been received in the correct order. Thus, there is a need for systems and methods that overcome some or all of these limitations by providing relatively fast, secure, and efficient authentication of data streams and other electronic content.

SUMMARY OF THE INVENTION

The present invention provides systems and methods for securely verifying and protecting the integrity of electronic data streams and other types of electronic data. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

In one embodiment, a method is disclosed for encoding a digital file in a manner designed to facilitate authentication of a streamed transmission of the file. In accordance with this embodiment, a progression of check values is generated, each check value in the progression being derived from a hashed portion of the file and from at least one other check value in the progression. A file is encoded by inserting each check value into the file in proximity to the portion of the file to which it corresponds. The encoded file is then transmitted to a user's system where it can be authenticated on-the-fly using the check values.

In another embodiment, a computer program product is disclosed for encoding data in a manner designed to facilitate authentication of a streamed data transmission. The computer program product preferably includes computer code for generating a progression of check values, each check value being derived, at least in part, from at least one other check value in the progression and from a hash of a portion of the data. Computer code is also provided for inserting each check value into the data in proximity to the portion of data to which it corresponds. Additional computer code is operable to send a streamed transmission of the encoded data to a user's system, where it is authenticated on-the-fly using the check values. The computer codes are contained on a computer readable medium such as a CD-ROM, DVD, MINIDISC, floppy disk, magnetic tape drive, flash memory chip, ROM, RAM, system memory, hard drive, optical storage, and/or a data signal embodied in a carrier wave.

In yet another embodiment, a computer program product is provided for verifying the integrity of a block of data. The computer program product preferably includes computer code for receiving a first portion of the block of data, and for receiving first and second check values in a chain of check values, each check value in the chain being derived from a corresponding portion of the block of data and from at least one other check value in the chain. Computer code is provided for using the first check value to verify the integrity of the first portion of the block of data and of the second check value. Computer code is also provided for allowing use of the first portion of the block of data if its integrity is successfully verified.

In another preferred embodiment, a system for performing fault-tolerant authentication of a stream of data is provided. The system includes a receiver for receiving sub-blocks of the stream, error-check values corresponding to the sub-blocks, and verification values in a chain of verification values associated with the stream, each verification value being derived from a sub-block of the stream and at least one other verification value in the chain. The system also includes error-detection logic operable to use the received error-check values to detect errors in corresponding sub-blocks of the stream. Error-handling logic is also provided, the error-handling logic being operable to record the detection of errors by the error-detection logic, and to block the receipt of additional sub-blocks if a predefined error condition is satisfied. The system also includes authentication logic, the authentication logic being operable to use the received verification values to verify the integrity of data sub-blocks, other verification values, and error-check values in the stream.

In yet another embodiment, a method for authenticating a block of data is disclosed. The method includes receiving a first sub-block of the block of data, a first error-check value, a first check value, and a second check value, wherein the first check value and the second check value form part of a progression of check values associated with the block of data, each check value in the progression being derived, at least in part, from a sub-block of the block of data and at least one other check value in the progression. In accordance with this method, the first error-check value is used to detect corruption of the first sub-block. Upon detecting corruption, the first check value and the first error-check value are used to verify the integrity of the second check value.

In another embodiment of the present invention, a method is disclosed for encoding a block of data in a manner designed to facilitate fault-tolerant authentication. In accordance with this method, a progression of check values is generated, each check value in the progression being derived from a portion of the block of data and from at least one other check value in the progression. The block of data is encoded by inserting the check values and error check values into the block in proximity to the portions of the block to which they correspond. The error-check values can be used to detect errors in the blocks of data, and, if errors are found, can be used to help authenticate the check values in the progression. The encoded block of data is transmitted to a user's system, the user's system being operable to receive and authenticate portions of the encoded block of data before the entire block is received.

In another preferred embodiment, a method is disclosed for encoding a digital file in a manner designed to facilitate secure quasi-random access to the file. In accordance with this method, a multi-level hierarchy of hash values is generated from the digital file, where the hash values on a first level of the hierarchy are at least partially derived from the hash values on a second level of the hierarchy. A root hash value is digitally signed, the root hash value being derived from each of the hash values in the hierarchy. The signed root hash value and at least a portion of the rest of the hierarchy are stored on a computer readable medium for use in verifying the integrity of the digital file.

In another preferred embodiment, a method for securely accessing a data block is disclosed. The method includes selecting a portion of the data block and retrieving from storage a corresponding root verification value and one or more check values in a hierarchy of check values, wherein the hierarchy of check values is derived, at least in part, from an uncorrupted version of the data block. The root verification value is used to verify the integrity of the other check values. A calculated check value is obtained by hashing a first sub-block of the data block, the first sub-block including at least part of the selected portion of the data block. The calculated check value is compared with an appropriate one of the stored check values, and at least part of the selected portion of the data block is released for use if the calculated check value equals the stored check value.

In yet another preferred embodiment, a system for providing secure access to a data file is provided. The system preferably includes a memory unit for storing a digital signature and a plurality of hash values related to the data file, the digital signature and the plurality of hash values forming a hierarchy.

The system includes a processing unit, logic for decrypting the digital signature to obtain a root verification value, hash verification logic for using the root verification value to verify the integrity of one or more hash values in the hierarchy, and logic for selecting a portion of the data file for use. A hashing engine is provided for calculating a hash of a data sub-block, the data sub-block including at least part of a selected portion of the data file. A first comparator is used to compare the hash of the data sub-block with a verified hash value in the hierarchy. Control logic is operable to release the data sub-block for use if the calculated hash equals the previously-verified hash.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 10A, 10B, and 10C illustrate an encoding scheme designed to facilitate secure content navigation in accordance with an embodiment of the present invention.

FIG. 14 is a data flow diagram illustrating a method for verifying the integrity of the hash values in a tree of hash values in accordance with an embodiment of the present invention.

DETAILED DESCRIPTION

A detailed description of the present invention is provided below. While the invention is described in conjunction with several embodiments, it should be understood that the invention is not limited to any one embodiment. On the contrary, the scope of the invention is limited only by the appended claims, and the invention encompasses numerous alternatives, modifications and equivalents. For example, while several embodiments are described in the context of a system and method for viewing or playing video, audio, or multimedia data, those skilled in the art will recognize that the disclosed systems and methods are readily adaptable for broader application. For example, without limitation, the present invention could be readily applied to the secure transmission and use of computer software or virtually any other type of information (hereinafter referred to collectively as "data," unless otherwise noted). In addition, while numerous specific details are set forth in the following description in order to provide a thorough understanding of the present invention, the present invention can be practiced according to the claims without some or all of these details. Finally, for the purpose of clarity, certain technical material that is known in the art related to the invention has not been described in detail in order to avoid unnecessarily obscuring the present invention.

Systems and methods are disclosed for enabling the recipient of a cryptographically-signed electronic communication to verify the authenticity of the communication on-the-fly, thus obviating the need to receive and store the entire communication before verifying its signature and releasing it to the end user. The systems and methods disclosed herein are believed to be as secure as conventional signature schemes which do not support on-the-fly signature verification. Moreover, the efficiency of the disclosed systems and methods compares favorably with the efficiency of conventional techniques in terms of processing time and memory usage. Thus, the present invention advantageously provides systems and methods for reducing the bandwidth, storage, and/or processing requirements of secure communications systems.

Figure 2A:
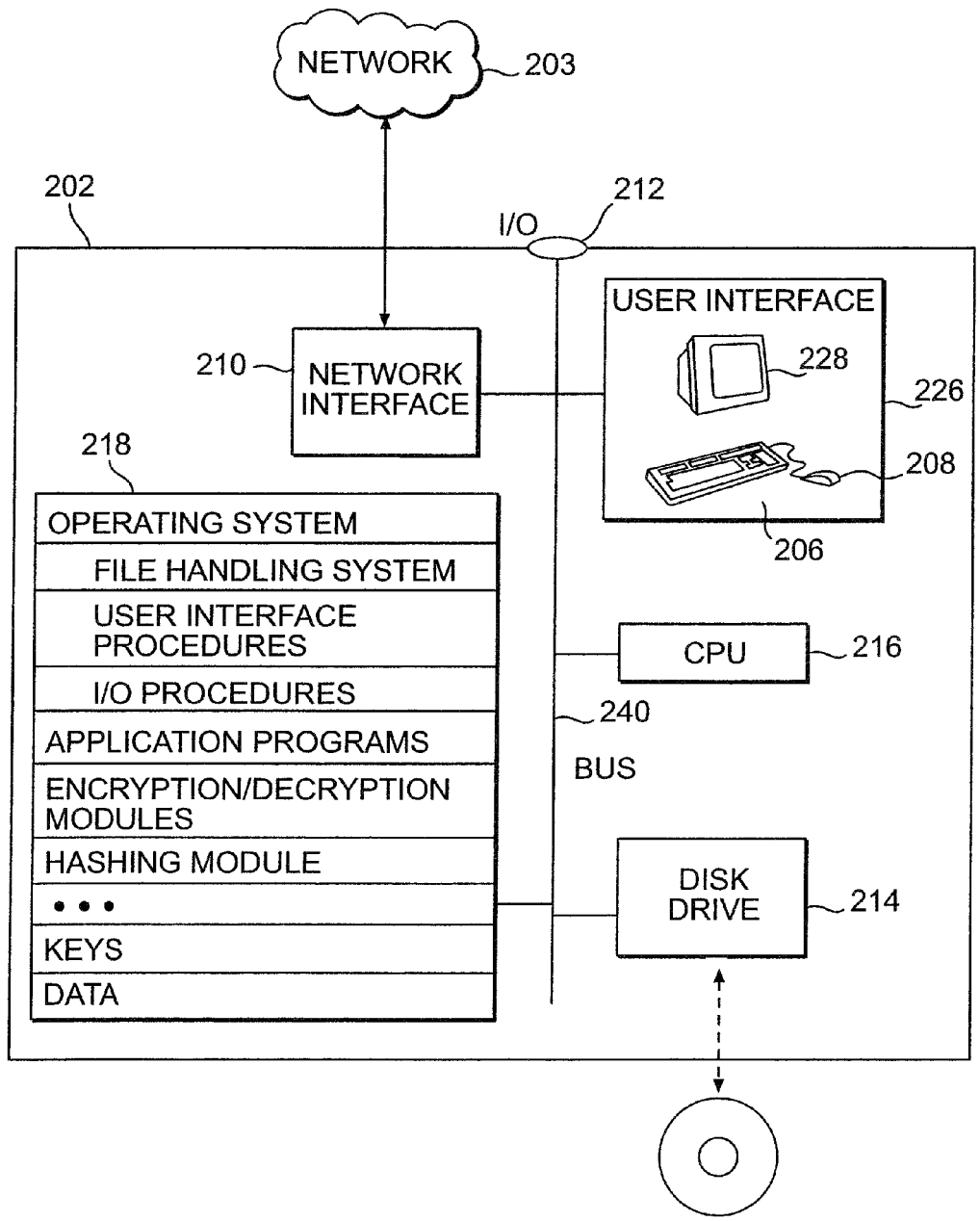
FIGS. 2A and 2B illustrate systems for practicing an embodiment of the present invention.

FIG. 2A illustrates a system for practicing an embodiment of the present invention. As shown in FIG. 2A, an encoding system 202, such as a general-purpose computer, is used to encode data and to transmit it to a recipient's system 204 (shown in FIG. 2B), which could be another computer, a television set-top box, a portable audio or video player, or any other suitable system.

As shown in FIG. 2A, encoding system 202 preferably includes:
  a processing unit 216;
  system memory 218, preferably including both high speed random access memory (RAM) and non-volatile memory, such as read only memory (ROM), erasable or alterable non-volatile memory (e.g., flash memory), and/or a hard disk, for storing system control programs, data, cryptographic keys, application programs, and the like;
  one or more input/output devices, including, for example:
    network interface 210 for communicating with other systems via a network 203 such as the Internet;
    I/O port 212 for connecting to, e.g., a portable device, another computer, or other peripheral devices; and
    one or more disk drives 214 for reading from, and/or writing to, e.g., diskettes, compact discs, DVDs, SONY® MINIDISC™ audio discs, produced by Sony Corporation of Tokyo, Japan and New York, N.Y., and/or other computer readable media;
  a user interface 226, including a display 228 and one or more input devices, such as keyboard 206 and mouse 208; and
  one or more internal buses 240 for interconnecting the aforementioned elements of the system.

The operation of system 202 is controlled primarily by programs contained in system memory 218 and executed by the system's processing unit 216. These programs preferably include modules for accepting input data and for processing the input data in accordance with the techniques described herein. For example, system 202 preferably includes modules for generating hash values, digital signatures, and other metadata relating to the input data, and also preferably includes modules for storing and/or transmitting some or all of the metadata and input data. One of ordinary skill in the art will appreciate, however, that some or all of the functionality of these modules could be readily implemented in hardware without departing from the principles of the present invention.

Figure 2B:
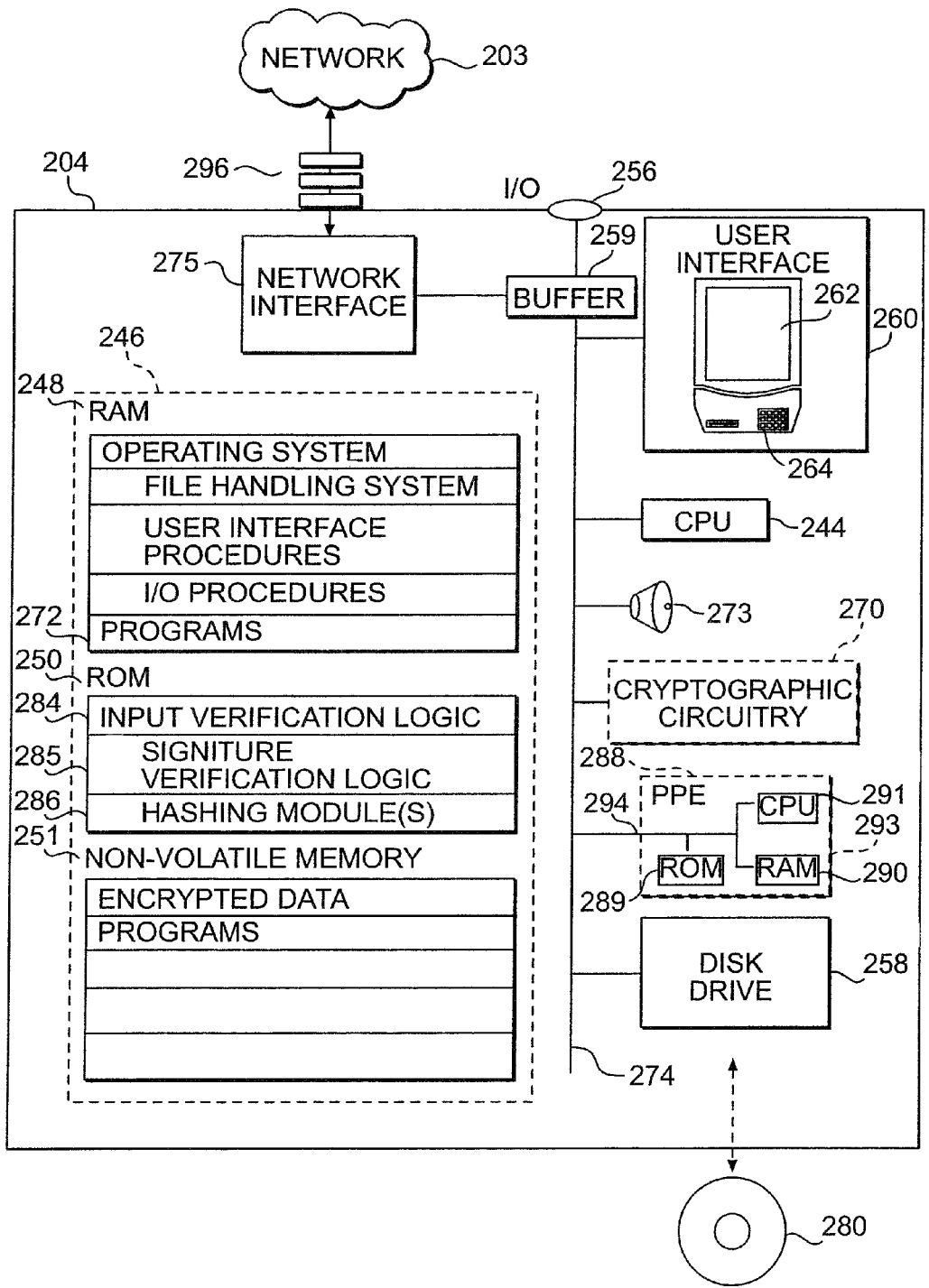

Referring now to FIG. 2B, a system 204 is shown for decoding and authenticating data that have been encoded by a system such as system 202. As previously described, system 204 may consist of a personal computer system, a portable audio or video player, a television set-top box, a telephone, a personal digital assistant, or any other suitable device. Recipient's system 204 is operable to receive, decode, and authenticate data, and to release authenticated data for viewing, listening, execution (in the case of software), or other uses. Data can be delivered to system 204 in a variety of ways, including via network interface 275, I/O port 256, a disc or diskette 280 inserted into drive 258, or by the physical installation of, e.g., a flash memory chip.

As shown in FIG. 2B, in one embodiment system 204 preferably includes:
- a processing unit 244;
- system memory 246, preferably including a combination of RAM 248, ROM 250, and non-volatile memory 251 (such as flash memory or a magnetic disk) for storing system control programs, data, and application programs, including programs such as input verification logic 284 for performing the techniques described herein;
- one or more input/output devices, including, for example:
    - network interface 275 for communicating with other systems via network 203;
    - I/O port 256 for connecting to, e.g., a portable device or another computer;
    - one or more disk drives 258 for reading data and/or programs from, e.g., diskettes, compact discs, DVDs, and/or MINIDISC™ audio discs; and/or
    - a speaker system 273;
- a user interface 260, including a display 262 and one more input devices such as control panel 264; and
- one or more internal buses 274 for interconnecting the aforementioned elements of the system.

As described in more detail below, input verification logic 284 is used to verify the authenticity of streaming data 296 received from network 203 via network interface 275, and/or to verify the authenticity of data contained in system memory 246, on disk 280, or on other storage media. Input verification logic 284 preferably includes signature verification logic 285 for unsigning signed data, and a hashing engine 286 for performing hashing operations. Although in one embodiment input verification logic 284 is implemented in firmware stored in ROM 250 and executed by processor 244, one skilled in the art will appreciate that input verification logic 284 could alternatively be implemented using optional circuitry 270, programs 272 stored in RAM 248, or any other suitable combination of firmware, circuitry, and/or application programs.

In yet another embodiment, input verification logic 284 is implemented in a special protected processing environment (PPE) 288, such as a chip or a tamper-resistant software module. As shown in FIG. 2B, protected processing environment 288 preferably includes non-volatile memory 289, volatile memory 290, a processor 291, a tamper-resistant barrier 293, and a communications port 294 for communicating with other components of system 204. Use of a protected processing environment can be advantageous, in that it provides an area that is protected from unauthorized observation or modification in which to store cryptographic keys and to perform cryptographic operations. Additional information on exemplary implementations of a protected processing environment can be found in Ginter, et. al "Systems and Methods for Secure Transaction Management and Electronic Rights Protection," U.S. Pat. No. 5,892,900, issued on Apr. 6, 1999, which is hereby incorporated by reference. It should be understood, however, that the present invention can be readily implemented using systems and methods that do not include or rely on such a protected processing environment.

Figure 3:
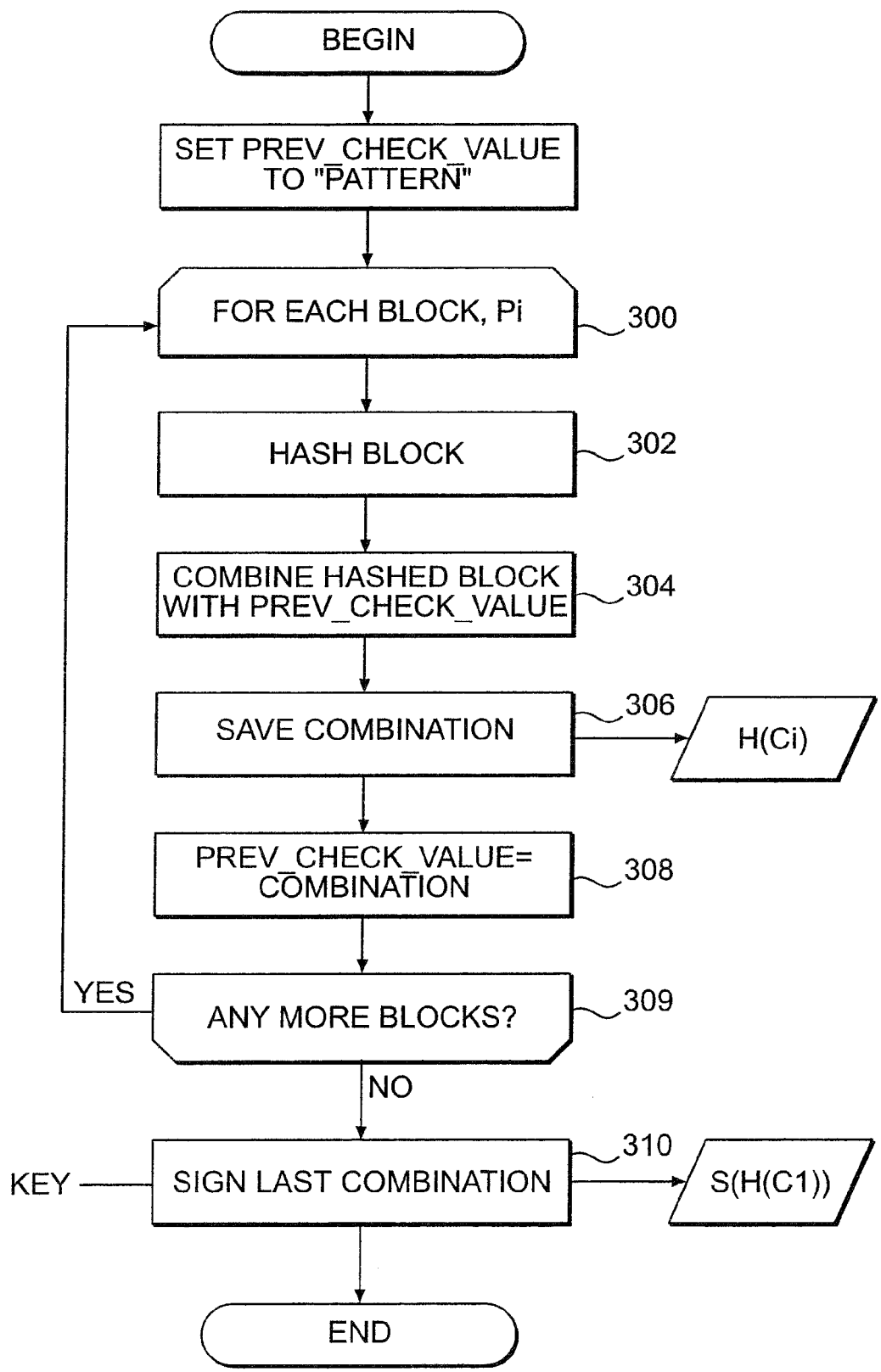
FIG. 3 is a flow chart illustrating a data encoding process in accordance with an embodiment of the present invention.
Figure 4:
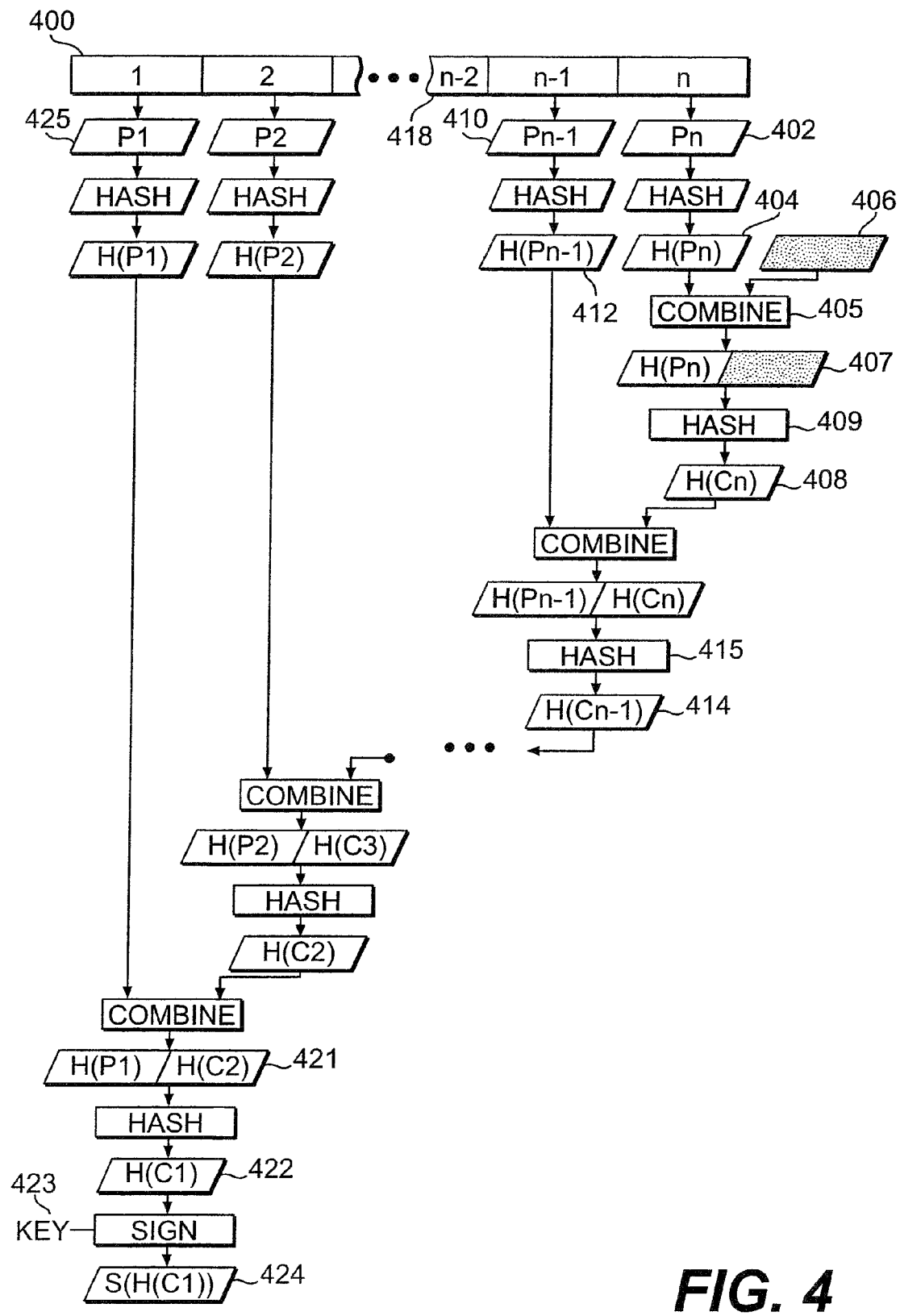
FIG. 4 is a block diagram illustrating the flow of data in an encoding process in accordance with an embodiment of the present invention.

The structure and operation of encoding and decoding systems 202 and 204 will now be described in more detail with reference to FIGS. 3-15. Encoding system 202 is operable to generate a chain or progression of verification values, each verification value in the chain being partially derived from the verification values that precede it. FIGS. 3 and 4 illustrate a technique for generating such a chain. The process shown in FIG. 3 is repeated for each sub-block $P_i$ of a data file (300), starting with the last sub-block of the file. As shown in FIG. 3, a hash is calculated for each sub-block $P_i$ (302). In a preferred embodiment a hashing algorithm such as SHA-1 is used; however, one of ordinary skill in the art will appreciate that any suitable hashing or combination function could be used, including the secure hashing functions described in B. Schneier, *Applied Cryptography,* 2d ed. (Wiley, 1996), pages 429-512 of which are hereby incorporated by reference. The hash of each sub-block is combined with the hash of the previous verification or check value in the chain (304), and the resulting check value, $H(C_i)$, is saved for later use and/or transmission (306). In one embodiment, $H(C_i)$ is created by (a) concatenating the hash of $P_i$ with the previously-generated check value $H(C_{i-1})$, and (b) hashing the result; however, it will be appreciated that other combination techniques can be used instead without departing from the principles of the present invention. $H(C_i)$ then becomes the "previous check value" for the next iteration (308), and the entire process (302-309) is repeated for the next sub-block. After each sub-block has been processed, the last check/verification value (corresponding to the first sub-block in the file, $P_1$) is signed using a suitable signature or identification scheme (310), such as RSA, DSA, Diffie-Hellman encryption, an elliptic curve-based algorithm, or a suitable one of the techniques described in B. Schneier, *Applied Cryptography* 2d ed. at pages 483-512.

FIG. 4 is a data flow diagram of an illustrative implementation of the encoding process shown in FIG. 3. Referring to FIG. 4, a block of data 400 is shown that includes n sub-blocks (e.g., 402, 410, 418, 425, etc.). For purposes of performing the operations shown in FIGS. 3 and 4, data block 400, or at least a portion of it, is preferably loaded into system memory 218 of encoding device 202. Data 400 may, for example, consist of an audio file compressed using the MP3 format, the WINDOWS® Media Audio format developed by Microsoft Corporation of Redmond, Wash., or any other suitable format. Data 400 may additionally (or alternatively) include video, textual, or multimedia information, a computer program or applet, or any other type of data or executable.

In FIG. 4, data block 400 is processed from right to left (i.e., from the back of the data block to the front). First, the hash of the last sub-block. $P_n$ 402, is calculated. The result of this hashing operation, $H(P_n)$ 404, is combined with a predefined pattern 406, and the combination 407 is hashed to yield check value $H(C_n)$ 408. Pattern 406 may, for example, consist of a block the same size as $H(P_n)$ 404 containing alternating 1's and 0's, a single repeating number, such as 0 or 10 hexadecimal (i.e., 0×A), or any other suitable set of values. In one embodiment, $H(P_n)$ 404 and pattern 406 are simply concatenated; however, it will be appreciated that a more complex combination function could be used instead. Alternatively, combination block 405 can be effectively eliminated by feeding $H(P_n)$ 404 and pattern 406 directly into the module or circuitry 409 that performs the hashing operation.

The next sub-block, $P_{n-1}$ 410, of data block 400 is processed in a similar manner. Specifically, the hash of sub-block $P_{n-1}$ 410 is calculated, and the result, $H(P_{n-1})$ 412, is combined with $H(C_n)$ 408. The combination of $H(P_{n-1})$ 412 and $H(C_n)$ 408 is hashed to yield $H(C_{n-1})$ 414, which is used in the processing of the next sub-block, $P_{n-2}$ 418. As discussed previously, a separate combination step can be eliminated by simply feeding $H(P_{n-1})$ 412 and $H(C_n)$ 408 directly into hashing module or circuitry 415. In addition, one of ordinary skill in the art will appreciate that in practice, encoding system 202 may include only one hash module, as opposed to a separate hash module or circuit for each sub-block (e.g., 408, 415, etc.), as shown in FIG. 4 to facilitate explanation. In such an embodiment, data flow through the hash module or circuit is controlled by system programs and/or clocking circuitry.

The process described in the preceding paragraph is repeated for each sub-block. $P_i$, of file 400, and the last check value, $H(C_1)$ 422, is signed by, e.g., encrypting it with the encoder's private key 423 to yield signed block $S(H(C_1))$ 424. Thus, after one complete processing pass over data block 400, encoding system 202 generates a check value, $H(C_i)$, for each sub-block, $P_i$, and a digital signature for at least the final sub-block. $P_1$ 425. These hash values and the signature are stored in memory 218.

To transfer data block 400 to a recipient 204, encoding system 202 first sends $S(H(C_1))$ 424, the sub-block to which $S(H(C_1))$ 424 corresponds (i.e., $P_1$ 425), and check value $H(C_2)$ 421. Encoding system 202 then continues to send successive sub-blocks, $P_i$, and check values, $H(C_{i+1})$—moving left to right in FIG. 4—until the entire file has been transmitted. If it is desired to keep file 400 secret during transmission, the sub-blocks, $P_i$, and optionally the check values, $H(C_i)$, can be encrypted before they are sent; however, this is not necessary for purposes of practicing the present invention.

Figure 5:
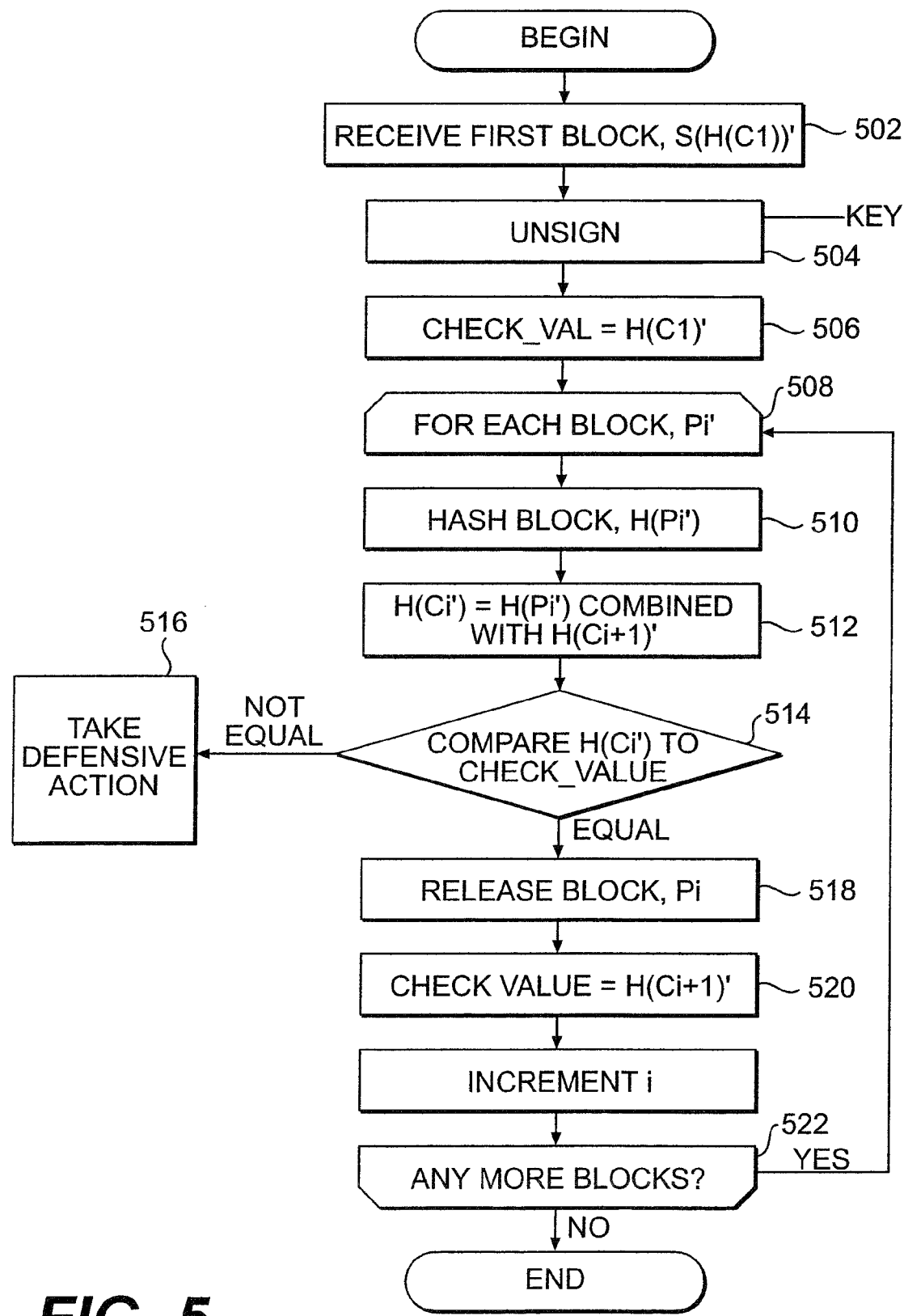
FIG. 5 is a flow chart illustrating an authentication process in accordance with an embodiment of the present invention.

The structure and operation of the decoding logic used by recipient 204 when receiving a file will now be described with reference to FIGS. 5 and 6. FIG. 5 is a flow chart of a technique for decoding and authenticating data in accordance with an embodiment of the present invention. As shown in FIG. 5, recipient 204 first obtains the signed check value, $S(H(C_1))'$, for the first sub-block of the file (502), and unsigns it using, e.g., the encoder's public key (504), which is preferably stored in recipient's ROM 250/289 or in another non-volatile memory store. The unsigned value, $H(C_1)'$, can then be used to verify the authenticity of the next sub-block of data that is received (506). (Note that the "prime" notation used throughout the Detailed Description and Drawings denotes data that have undergone, e.g., a transmission or possible transformation that may have altered the data from their original form; for example, "$P_i$," represents an original sub-block, while "$P_i'$" represents that sub-block—or a sub-block purporting to be $P_i$—after transmission to, e.g., recipient 204).

As each sub-block $P_i$ in the file is received (508), the hash of the sub-block is calculated using the same hashing function used by encoding system 202 in block 302 of FIG. 3 (510). The hash of the sub-block is then combined with the next verification value that is received (i.e., $H(C_{i+1})$), and the hash of the combination is computed (512). The technique used to form the combination in block 512 is the same or equivalent to the technique used by encoder 202 in block 304 of FIG. 3. Next, the calculated check value $H(C_i')$ is compared with the check value that was received, $H(C_i)'$ (514), which in the case of the first sub-block, $P_1$, is the unsigned value $H(C_1)'$ obtained in block 504.

If the two values are equal, then sub-block $P_i$ and check value $H(C_{i+1})$ are deemed to be authentic, and the sub-block can be released for use (518). The check value is then updated (520), and the entire process (508-522) is repeated for the next sub-block and check value that are received.

However, if comparison block 514 indicates that $H(C_i')$ is not equal to $H(C_i)'$, then $P_i$ is judged to be unauthentic, as an inequality at block 514 indicates that $P_i$ and/or $H(C_{i+1})$ were modified after being processed by encoding system 202. Upon detecting such a condition, decoding system 204 is preferably operable to take appropriate defensive action 516. For example, decoding system 204 can terminate the connection with the source of the data, prevent the user from making further use of the data, display a warning or error message on display 262, shut itself down, shut down the application that was receiving or using the file, or simply record the occurrence of this condition for later reporting or action. Although decoding system 204 could optionally continue playing or making use of the file even after an inequality was detected at block 514, the file would no longer be authenticated with the security of the digital signature, thus making it possible for a clever attacker to mount an attack at relatively little cost compared with that of cracking the signature.

Figure 6:
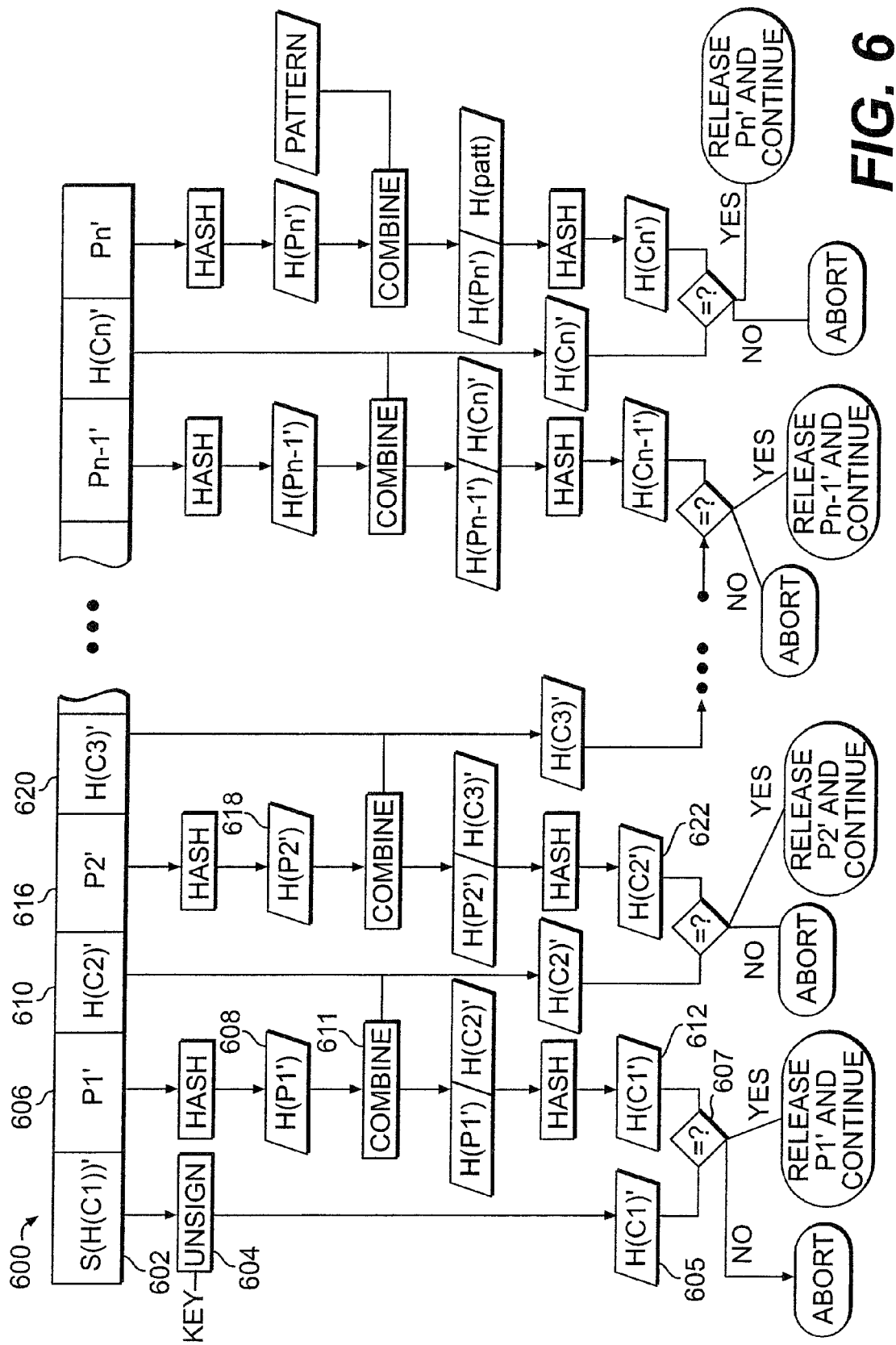
FIG. 6 is a block diagram illustrating the flow of data in an authentication process in accordance with an embodiment of the present invention.

FIG. 6 is a data flow diagram of an illustrative implementation of the process shown in FIG. 5. Referring to FIG. 6, a stream of data 600 is shown that could be received from, e.g., network interface 275, input port 256, or disk drive 258. As sub-blocks of data stream 600 are received (from left to right in FIG. 6) they are processed in the manner described in connection with FIG. 5. If additional sub-blocks are received while other, previously-received sub-blocks are still being processed, buffer 259 can be used to temporarily store the incoming data until the decoding system is ready to process them.

Referring to FIG. 6, when the first signed check value $S(H(C_1))'$ 602 is received, it is unsigned using, e.g., the encoder's public key 604. The unsigned check value, $H(C_1)'$ 605, is stored in system memory 246/290 for use in verifying the authenticity of the first sub-block, $P_1'$ 606, contained in data stream 600. When sub-block $P_1'$ 606 is received, it is hashed using the same hashing function that the encoder used in block 302 of FIG. 3. The result of this hashing operation, $H(P_1')$ 608, is combined with the next check value in the stream, i.e., $H(C_2)'$ 610, and the hash of this combination, $H(C_1')$ 612, is calculated. As described in connection with block 512 of FIG. 5, the technique used to form combination 611 is the same or equivalent to the technique used in block 304 of FIG. 3.

Next, comparison block 607 compares $H(C_1')$ 612 with check value $H(C_1)'$ 605. If these two values are equal, then the decoding system can be satisfied that $P_1'$ 606 and $H(C_2)'$ 610 are authentic (i.e., that they are equal to $P_1$ 425 and $H(C_2)$ 421, respectively, from encoding system 202). Decoding system 204 then releases content $P_1'$ 606 for use by the system, saves $H(C_2)'$ 610 for later use in authenticating the next block of data, $P_2'$ 616, and continues the process of receiving and authenticating successive blocks in stream 600. If, on the other hand, comparison 607 fails, decoding system 204 can terminate further receipt of data stream 600 and/or take other defensive action.

The next sub-block, $P_2'$ 616, of stream 600 is processed in a substantially similar manner. Specifically, the hash of sub-block $P_2'$ 616 is calculated, and the result, $H(P_2')$ 618, is combined with $H(C_3)'$ 620. The combination of $H(P_2')$ 618 and $H(C_3)'$ 620 is hashed to yield $H(C_2')$ 622. $H(C_2')$ 622 is compared with $H(C_2)'$ 610, which was authenticated in connection with the authentication of $P_1'$ 606, as described in the preceding paragraph. If the comparison indicates that the two values are equal, then $P_2'$ 616 and $H(C_3)'$ 620 are deemed to be authentic; otherwise, appropriate defensive measures are taken.

The basic process set forth in the preceding paragraph is repeated for each sub-block, $P_i'$, of stream 600, as shown in FIG. 6. Thus, the techniques shown in FIGS. 5 and 6 are operable to detect attempts by an attacker to tamper with data 400 or the check values used to verify that data's authenticity.

Figure 1A:
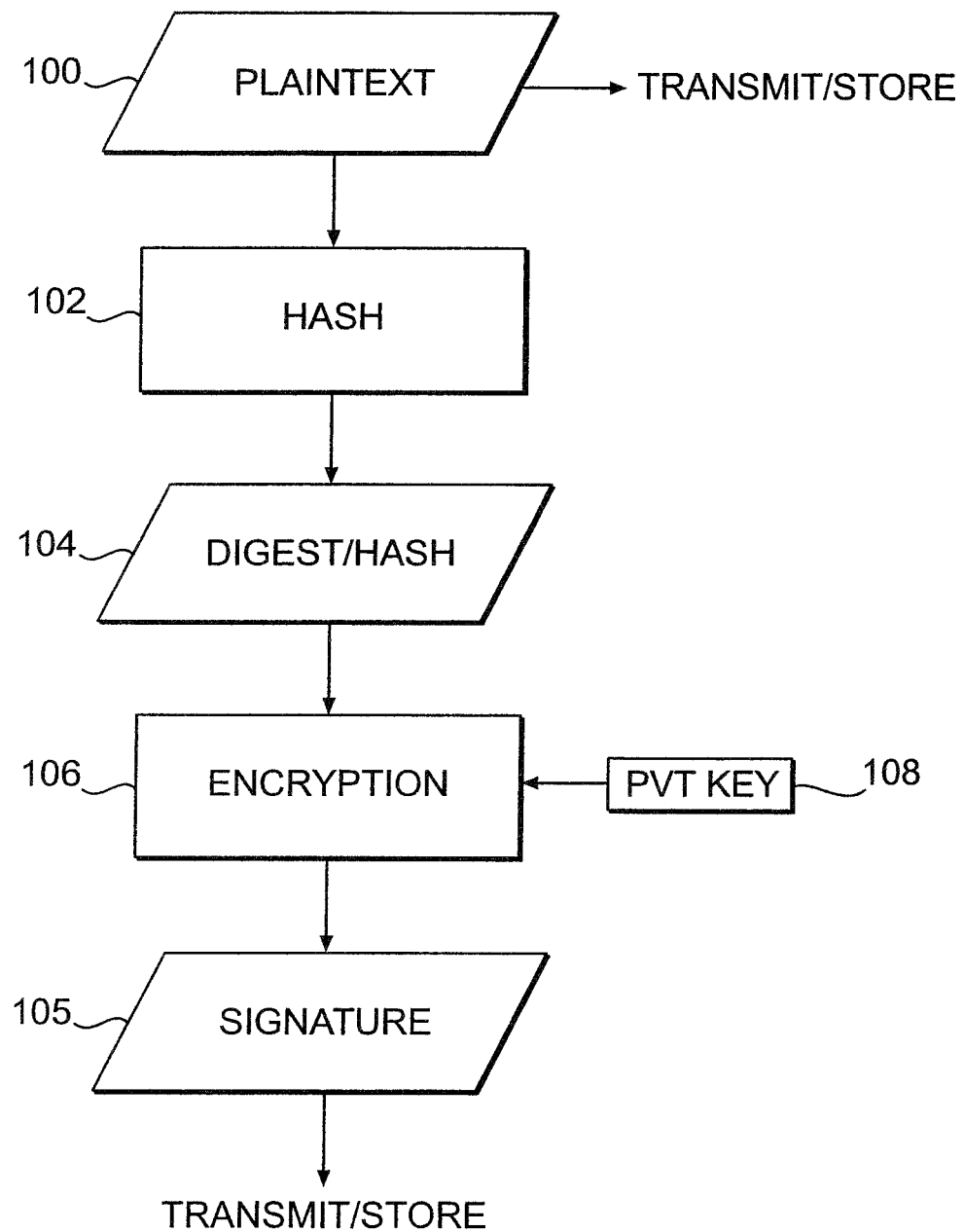
FIGS. 1A and 1B illustrate a conventional digital signature verification technique.
Figure 1B:
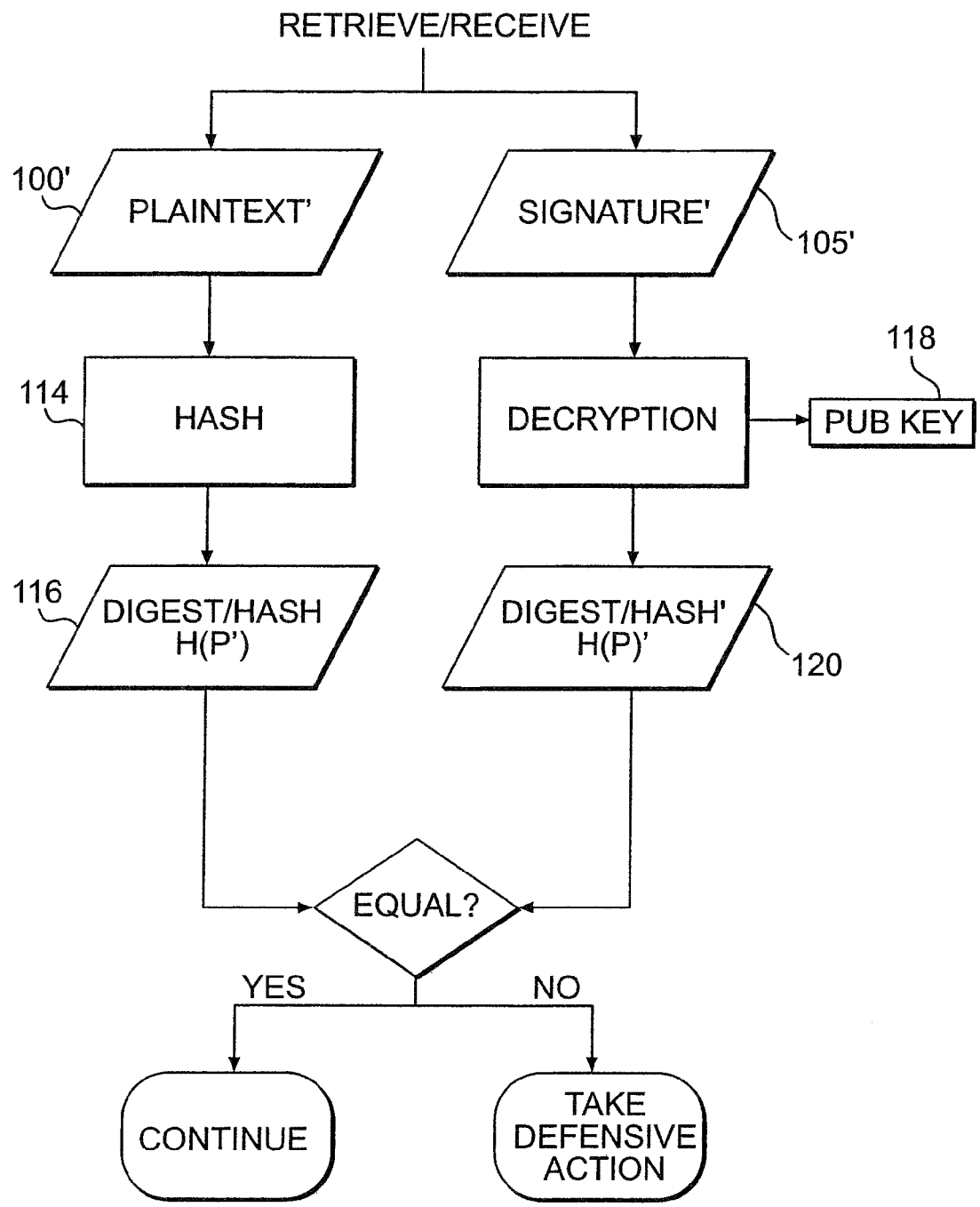

As shown in FIG. 4, the check values, $H(C_i)$, and the hashed sub-blocks, $H(P_i)$, are effectively interlocked, forming a chain or progression whose root is signed to yield signature 424. Signature 424 is thus partially derived from each of the check values (or links) and sub-blocks of the file 400. Because the authenticity determination for each sub-block thus depends, at least in part, on the signature value, this scheme is believed to be as secure as the conventional technique described previously in connection with FIGS. 1A and 1B. Yet unlike the conventional scheme, it is able to preserve the unity of the signed document and does not require that the entire document be received or stored in memory before its authenticity can be verified. Although the method shown in FIGS. 3-6 introduces some processing and space overhead, it is preferable to the alternative of signing each sub-block separately, since there is only one public key operation, the hash operations are relatively cheap, and the size of each hash is typically much smaller than the size of a full cryptographic signature (e.g., by a factor of 10). It will be appreciated that the methods and structures set forth in FIGS. 3-6 illustrate one embodiment of the present invention, and that modifications can be made to these methods and structures without departing from the principles of the present invention.

Another problem that arises in the authentication of data streams and other data files is that of errors introduced by the communication system and/or storage media. For example, burst errors can occur in a network communication due to electromagnetic interference, faulty connections, and/or lost or delayed packets of data. Similarly, data stored on, and retrieved from, computer readable media can suffer from bit errors due to defective storage cells or read/write errors, and these errors can cause data to be lost or misinterpreted.

Although such errors are often benign, in that they may not evidence a malicious intent to tamper with the system, they can nevertheless interfere with attempts to securely authenticate data communications, as bit errors in either the plaintext message, the check values, or the encrypted signature will typically cause authentication to fail. Yet if transmission of a file is simply aborted each time a portion of the file fails to verify, random bit errors may force a user attempting to access a relatively large file to restart the transmission multiple times before he or she is eventually able to obtain a perfect, verifiable copy of the file.

This result is especially undesirable, as errors resulting from the unreliability of storage and communications media are often too small to be detected by users. Moreover, even when such errors are detectable, users will typically prefer to continue receiving the stream of content, rather than restart reception from the beginning. For example, in the case of a user listening to a streamed audio report, the user will typically wish to hear the entire report from start to finish, even if bit errors add occasional noise, rather than have to restart the report each time an error is detected. In short, users will often be willing to sacrifice signal quality in order to avoid the alternative of restarting reception of the signal each time an error is detected, as restarting reception effectively eviscerates one of the primary benefits of streaming delivery—i.e., the ability to use data as it is being delivered, instead of having to wait until an entire file is received. Thus, there is a need for authentication schemes that exhibit fault tolerance.

Figure 7:
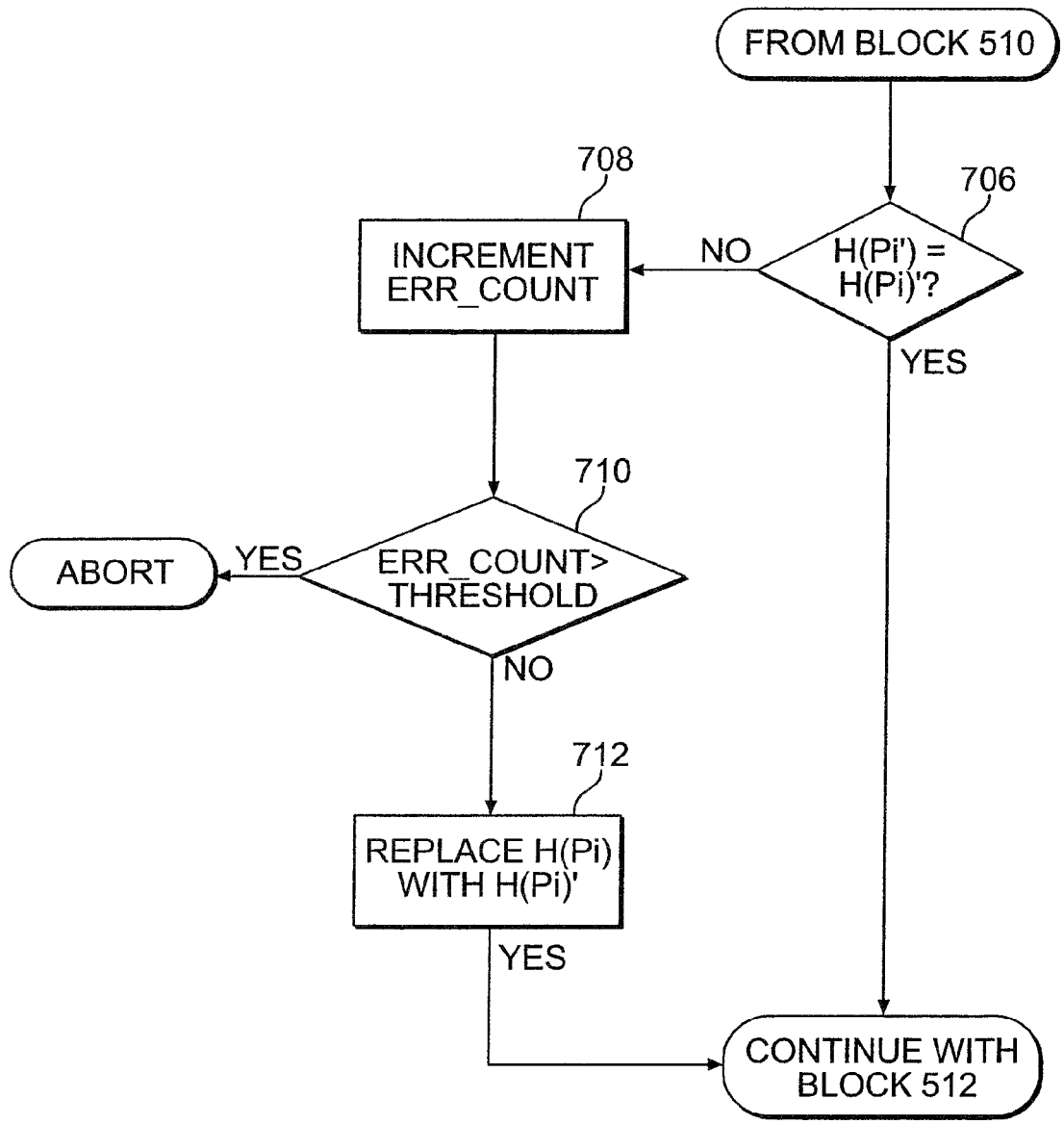
FIG. 7 is a flow chart illustrating an error recovery process in accordance with an embodiment of the present invention.
Figure 8:
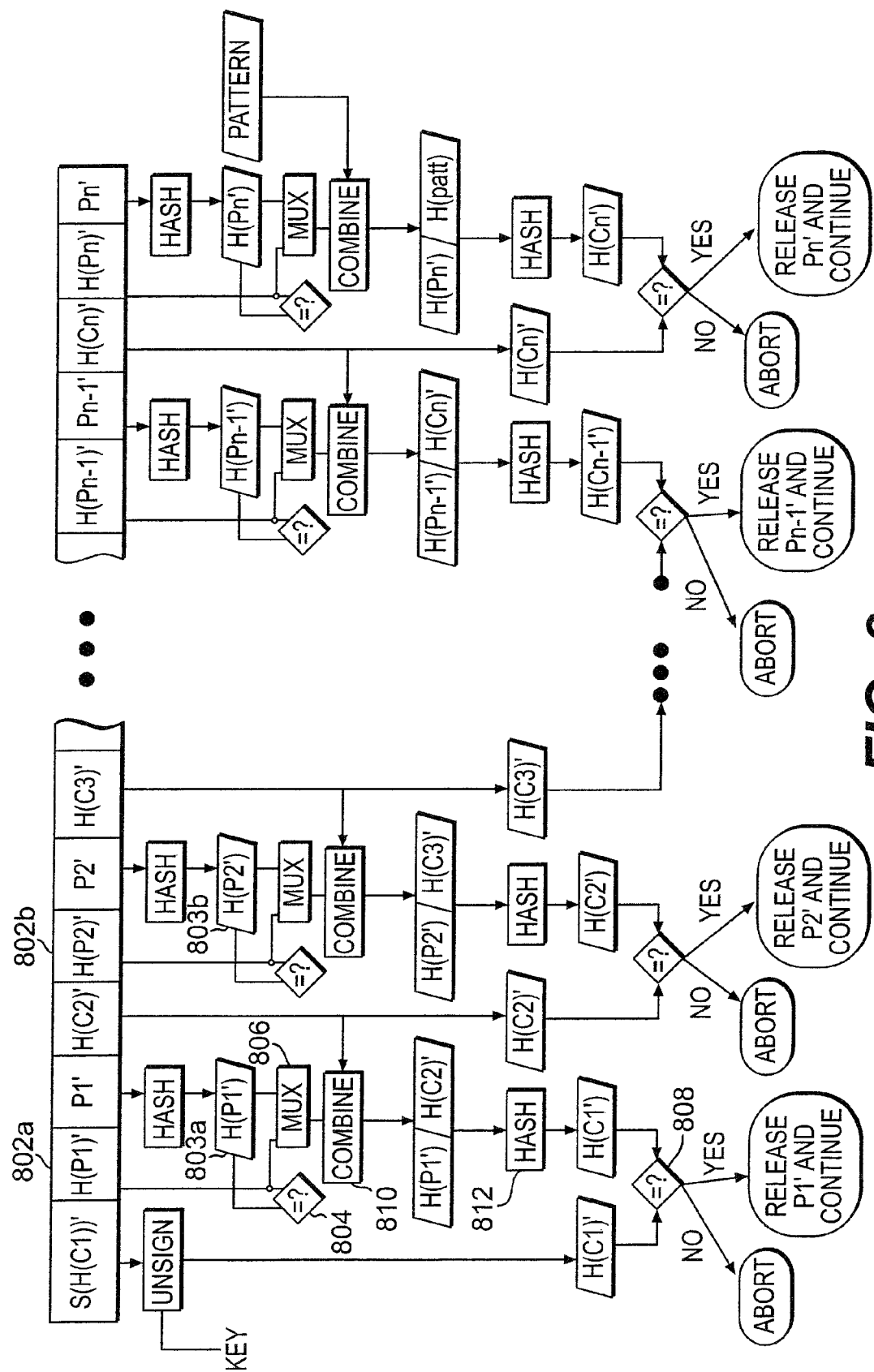
FIG. 8 is a block diagram illustrating an error recovery process in accordance with an embodiment of the present invention.

The present invention solves the problem described above while requiring only a small amount of additional data to be inserted into the transmitted data stream, as shown in FIGS. 7 and 8. Specifically, in a preferred embodiment the hash, $H(P_i)$, of each sub-block, $P_i$, is also packaged in the transmitted data stream. This can be done, for example, between blocks 302 and 304 of the flow chart shown in FIG. 3. As described in more detail below, the additional hash values allow detection of bit errors in $P_i$ (and/or $H(P_i)$) prior to, and/or independent of, the detection of such errors by the authentication process described in connection with FIGS. 5 and 6. In this way, if part of the content stream is corrupted, a correction can be made that enables the verification of the rest of the stream to continue.

FIG. 7 is a flow chart of an illustrative embodiment of such an error-recovery process. The process described in FIG. 7 can be inserted between blocks 510 and 512 of the authentication process shown in FIG. 5. Referring to FIG. 7, when the decoding system receives a sub-block, $P_i'$, and its corresponding hash, $H(P_i)'$, the decoding system computes the hash of $P_i'$ as previously described in connection with FIG. 5 (i.e., block 510). The computed hash, $H(P_i')$, is then compared with the hash, $H(P_i)'$, that was inserted into the data stream. If the hashes are equal, the signature verification scheme proceeds with the process shown in FIGS. 5 and 6. However, if the comparison fails (i.e., a "no" exit from block 706), this provides evidence that sub-block $P_i$ has been corrupted. When this occurs, the decoding system is operable to use the included hash $H(P_i)'$ in place of the computed hash $H(P_i')$ in the subsequent authentication process (712), thus enabling the authentication to succeed (provided, of course, that the included hash $H(P_i)'$ has not been corrupted, too).

In a preferred embodiment, the detection of errors at block 706 is recorded, so that the decoding system can detect unduly high levels of such errors and take appropriate defensive action. For example, the system might simply sum the detected errors (708) and compare the running total with a threshold or a threshold percentage (710). Alternatively, the pattern of detected errors between blocks can be recorded and analyzed, so that suspicious patterns can be detected (e.g., errors in more than a predefined number of consecutive blocks, errors at the same position in comparable groups of blocks, etc.), even though the gross amount or percentage of errors may not exceed a given threshold. It should be appreciated, however, that any suitable error response could be used without departing from the principles of the present invention.

FIG. 8 is an illustration of how the data flow diagram shown in FIG. 6 could be modified to incorporate the error-recovery process described above. As shown in FIG. 8, the primary modifications are the addition of hash blocks 802 in the data stream, the addition of comparison blocks 804, and the addition of appropriate logic 806 to handle the output of the comparison blocks. In a hardware implementation, for example, the output of comparator 804 could be used to select the appropriate one of H($P_i'$) and H($P_i$)' using a multiplexer 806.

In one embodiment additional fault tolerance is provided by accounting for errors that may occur in the included hash. H($P_i$)' 802. Errors in H($P_i$)' can lead to inappropriate rejection of the content, since if H($P_i'$) 803 is replaced by a corrupted H($P_i$)' 802—i.e., a "no" output from comparison 706—comparison 808 can be expected to fail even if block $P_i'$ has not been corrupted. Thus, in one embodiment if H($P_i'$) 803 is replaced by H($P_i$)' 802 for a given block, and an inequality is later detected by comparison 808, blocks 810 and 812 are executed again using the computed hash H($P_i'$) 803 instead of the included hash H($P_i$)' 802. If comparison 808 then succeeds, the recipient can be confident that data $P_i'$ is authentic. Thus, this embodiment prevents errors in the included hash from causing incorrect invalidity assessments to be made about $P_i'$. It will be appreciated however, that given the relative size differential between the included hash value H($P_i$)' and the data block $P_i'$ to which it corresponds—typically on the order of 20 bytes for the hash versus 64 KB for the block (or 0.03%)—correct handling of this relatively rare condition may not, in a given application, be worth the extra cost it imposes in memory usage and/or chip-count.

Thus, the mechanism described above provides fault tolerance while avoiding serious compromise to the security offered by the authentication process. This would not be the case, for example, if a certain number of failed comparisons 514 were allowed in the process shown in FIG. 5, since any such failed comparison would break the connection between the remaining portion of the hash chain and the signature of the root—the chain's dependence on the signature (and vice-versa) being responsible for the bulk of the security offered by this scheme.

Another problem facing signature-based authentication schemes is that of providing some degree of random access to the signed data in a manner that does not compromise the ability to detect unauthentic data. For example, a user may wish to access a track in the middle of a CD or database without having to listen to each of the preceding tracks and/or without having to wait for each track to be authenticated. However, if the root signature is at the beginning of the CD or database, allowing access to a track in the middle, without first verifying the authenticity of each intervening block of data and each block's corresponding check value, would break the chain of trust connecting the intermediate track to the root signature.

In one embodiment secure content navigation and quasi-random access are enabled by constructing a tree of hash values, the tree deriving its security in substantially the same manner as the hash chain described above in connection with FIGS. 3-8. The tree enables efficient authentication of the content contained at an arbitrary, user-selected location within a content file, and enables decoding/playing device 204 to efficiently and dynamically authenticate successive blocks of content starting from the selected location. The construction and use of such a tree is described below in connection with FIGS. 9-15.

Figure 9:
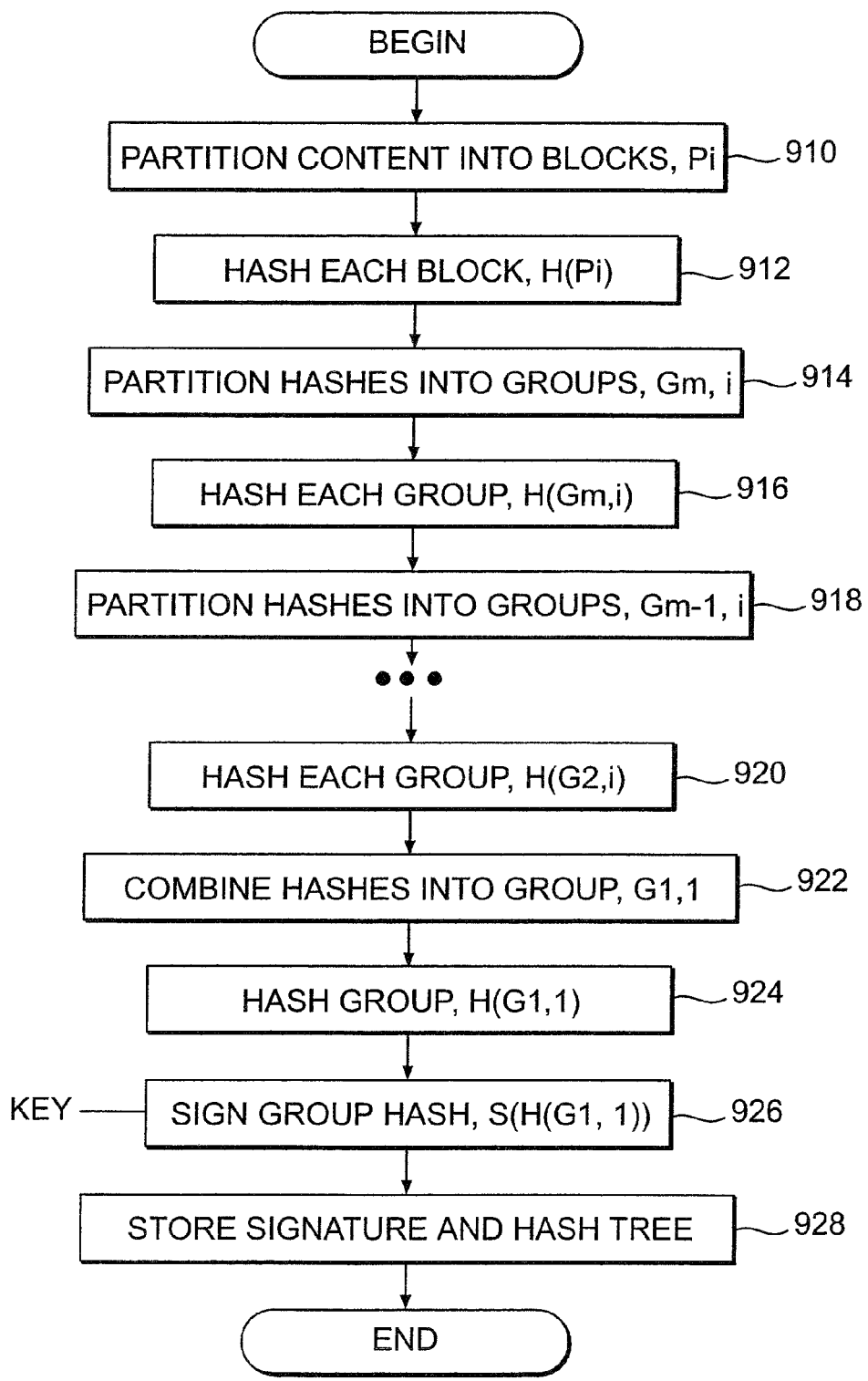
FIG. 9 is a flow chart of a method for processing a block of data in a manner designed to facilitate secure content navigation.

FIG. 9 is a flow chart illustrating a process for encoding data in a manner designed to facilitate efficient and secure content navigation. As shown in FIGS. 9 and 10, the content provider preprocesses a predefined portion of content (e.g., a file or a track) by dividing it (logically or physically) into segments $P_i$ (910), similar to the manner in which content was divided into sub-blocks in FIG. 4. The hash H($P_i$) of each of these segments is computed (912), groups of these hashes are combined (914), and the hash, H($G_{m,i}$), of each of the new groups is calculated (916) (where the subscript "m" denotes the mth level of the hash tree, and the subscript "i" denotes the ith group-hash of that level). As shown in FIG. 9, this process is repeated until a single group hash, H($G_{1,1}$), is obtained for the entire file (918-924). The final group hash is then signed (926), and the signature and a predefined portion of the previously-calculated hash values are stored for later use in verifying the integrity of the content to which they correspond (928).

Figure 10A:
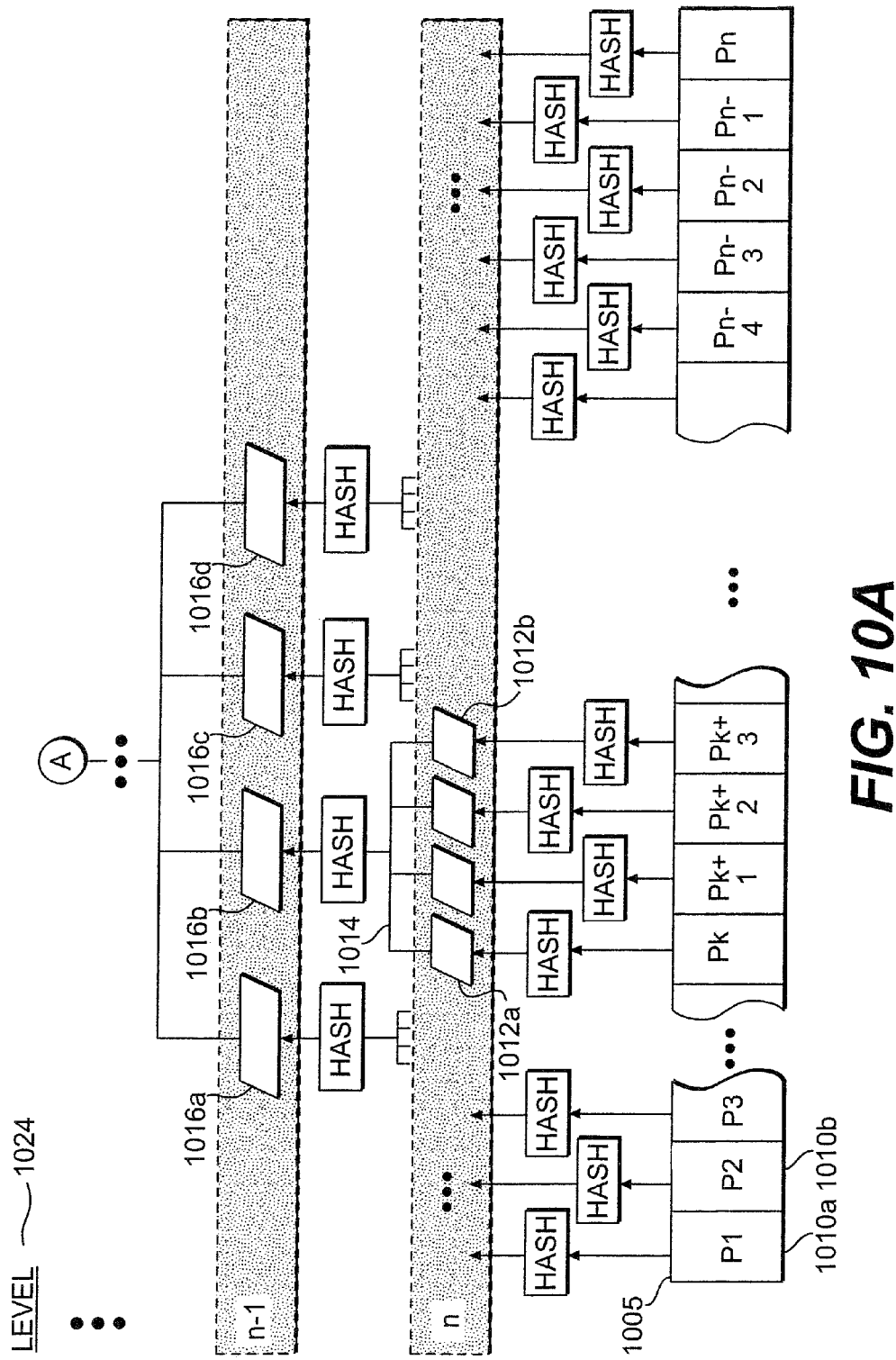

FIGS. 10A and 10B further illustrate the process described above. Referring to FIG. 10A, a content file 1005—e.g., a document, movie, audio track, etc.—is partitioned logically and/or physically into a plurality of segments, $P_i$ 1010. In a preferred embodiment, segments 1010 are of equal size; however, it will be appreciated that segments of different sizes could also be used. The hash of each segment 1010 is taken, yielding a plurality of hash values, H($P_i$) 1012. Hash values 1012 are partitioned into groups 1014 (again, either logically or physically), and the hash of each such group, H($G_{n-1,i}$) 1016, is computed. In the example shown in FIGS. 10A and 10B, groups of four hashes 1012 are concatenated; however, it will be appreciated that any suitable predefined number of hashes could be combined in any suitable manner without departing from the principles of the present invention. In addition, although a symmetric tree structure is shown in FIGS. 10A and 10B, one of ordinary skill in the art will appreciate that any suitable data structure could be used, including without limitation a b-tree, a binary tree, a t-ary tree, an asymmetric tree, or a tree with a non-uniform branching factor.

As shown in FIG. 10B, the process of combining groups of hashes and hashing the result is repeated for each level of hashes 1024, and concludes once a final top-level group hash, H($G_{1,1}$) 1020, is obtained for the entire file 1005. Signature 1022 is formed by signing final group hash 1020. Thus, as shown in FIG. 10C, a tree 1026 of hash or check values is generated, culminating in a signed check value 1022 for the entire file 1005 or the relevant portion thereof. As described above, some or all of tree 1026 may be stored in, e.g., memory 218 of encoding system 202, and/or transmitted to a user's system 204 via, e.g., network 203, disc 280, or I/O port 212 for use and/or storage along with the content file 1005 to which it corresponds. It should be appreciated that the tree structure of the present invention is readily scalable. Thus, for example, separate trees (with separate root signatures) can be provided for different subparts of a file (e.g., separate tracks on an audio CD), or a single tree can be provided for the entire file.

Figure 11:
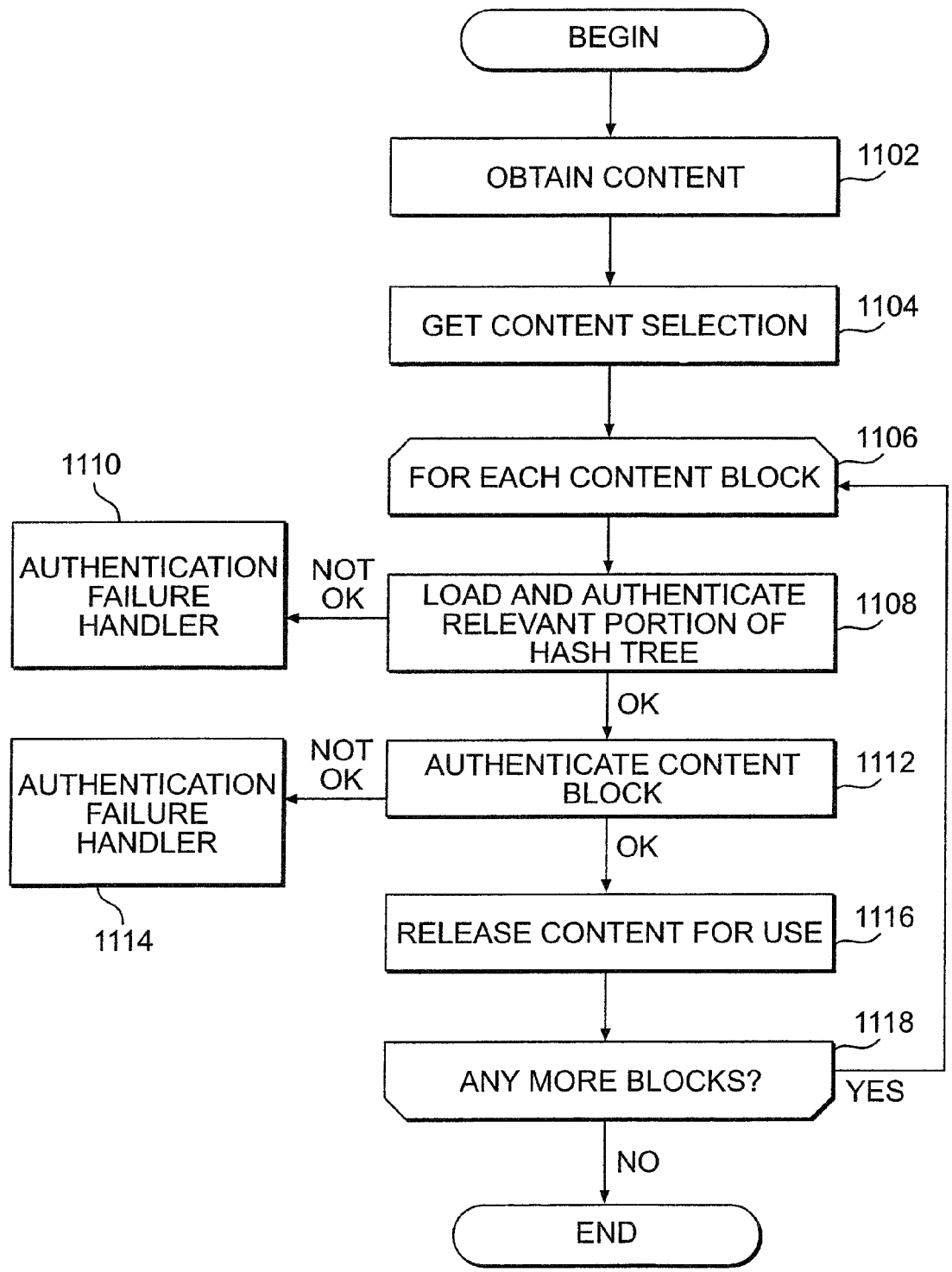
FIG. 11 is a flow chart of a method for accessing a content file in accordance with an embodiment of the present invention.

FIG. 11 is a flowchart illustrating a method by which a user can access content that has been processed in the manner described above. Referring to FIG. 11, the user first obtains the content file and its corresponding signature and hash tree (1102). For example, the user's system 204 may receive these data from network 203 or a disc 280 inserted into disc drive 258. When the user wishes to access a particular portion of the content file (1104)—for example, a particular track on an audio CD, or a particular portion of a track—the relevant portion of the hash tree is loaded into memory 246 and/or secure memory 290, and the integrity of the loaded hash values are verified (1108). In a preferred embodiment, input verification engine 284 loads only those groups of hash values in the tree that are needed to verify the authenticity of the first block of the requested portion of content; however, it will be appreciated that any suitable portion of the tree could be loaded in any suitable manner without departing from the principles of the present invention. For example, in one embodiment only the top two levels of hash values (i.e., levels 1 and 2 in FIG. 10C) are retained in memory with the content file and loaded into secure memory when access to a portion of the content file is requested. And in another embodiment, the entire hash tree is loaded into memory 290 and authenticated.

If any of the loaded hash values fail to authenticate (i.e., a "Not OK" exit from block 1108), control passes to a verification failure handler to take appropriate defensive action (1110). The verification failure handler may, for example, simply display an error message to the user and terminate further access to the content. Or, in another embodiment, the verification error handler may re-compute the hash value(s) that failed to verify, using the appropriate portion of the stored content file. The recomputed hash values can then be combined, hashed, and compared with the original signature. Such an approach can be useful if the hash values, but not the content or the signature, have been corrupted. In other embodiments, other error handling techniques are used.

Referring once again to FIG. 11, after the hash tree (or the relevant portion thereof) has been authenticated (1108), access to the content is allowed to proceed (1112-1118). The integrity of the selected content is verified using the previously-authenticated hash values (1112). If the content is deemed to be authentic, it is released for use (e.g., sent to the system's speakers, display screen, printer, etc.) (1116); otherwise, an error handling routine is called (1114). The process of authenticating and releasing content is repeated for each successive block of content in the file (1118) until either the end of the file is reached or the user selects a new location in the file, at which point the process shown in FIG. 11 is started once again.

Figure 12:
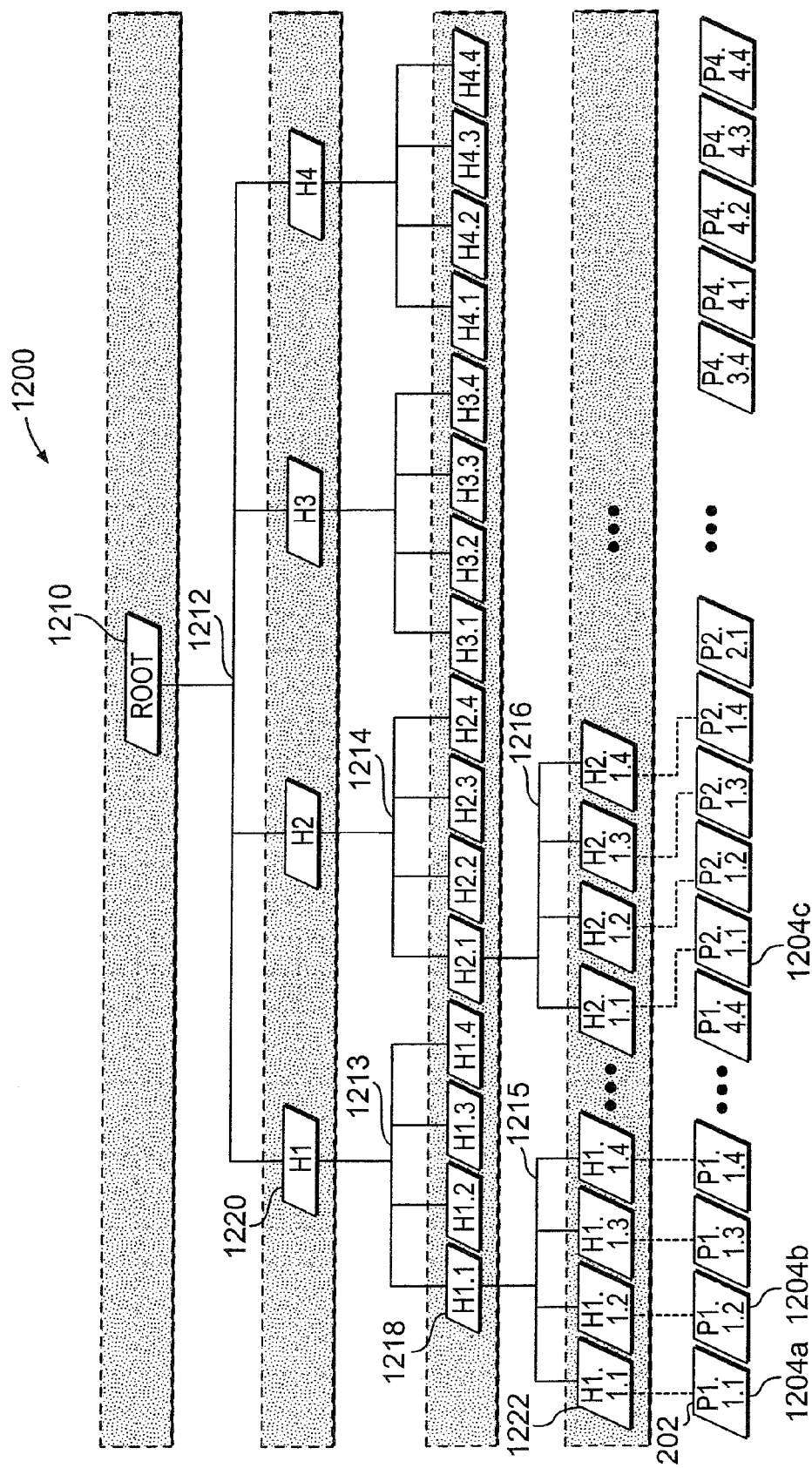
FIG. 12 illustrates an authentication tree in accordance with one embodiment of the present invention.

FIGS. 12 and 13 illustrate one preferred implementation of the authentication technique described in connection with FIG. 11. Referring to FIG. 12, a hash tree 1200 is shown that corresponds to content file 1202, the content file being comprised of a plurality of blocks 1204. Hash tree 1200 could, for example, be constructed in the manner described above in connection with FIGS. 9 and 10. When a user wishes to access a particular portion of content, decoding system 204 preferably loads the relevant branches of tree 1200 into a memory such as RAM 290 of PPE 288. For example, if the user wishes to access content block 1204c, then, as shown in FIG. 12, root 1210, the four level-2 hashes 1212, four of the level-3 hashes 1214, and four of the level-4 hashes 1216 are loaded into memory 290 and authenticated.

Figures 13A, 13B:
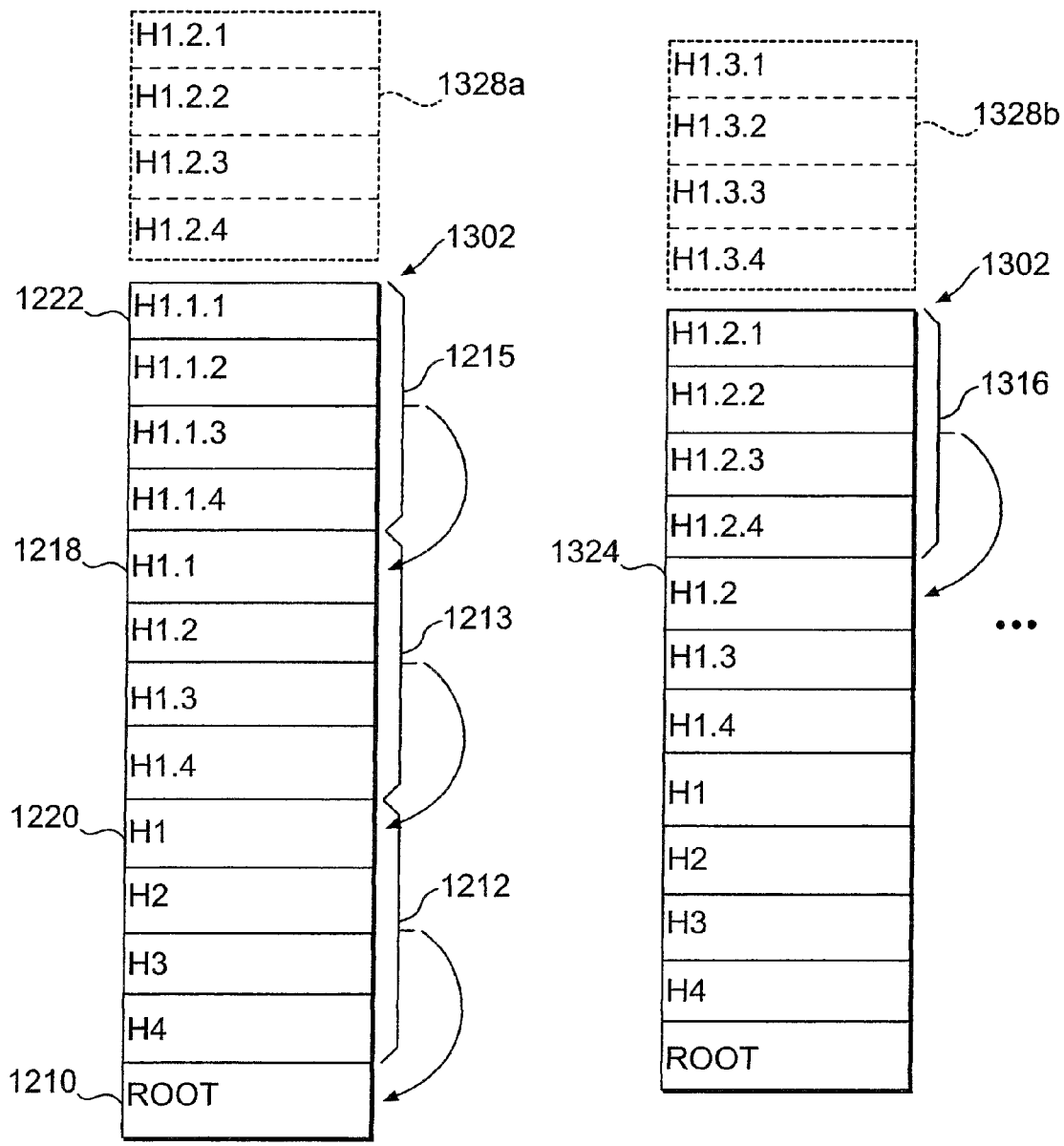
FIGS. 13A, 13B, 13C, and 13D illustrate a memory management technique for use in conjunction with the secure content navigation methods of the present invention.

FIGS. 13A, 13B, 13C, and 13D provide a more detailed illustration of a preferred technique for loading relevant portions of tree 1200 into memory and for authenticating those tree portions along with the content to which they correspond. As shown in FIG. 13A, in one preferred embodiment hash values from tree 1200 are stored in memory 290 in a stack data structure 1302. FIGS. 13A-13D illustrate the state of stack 1302 at various points during the authentication of a piece of content. As shown in FIG. 13A, if a user requests access to block 1204a of FIG. 12, the corresponding hash groups 1210, 1212, 1213, 1215 of tree 1200 are pushed onto stack 1302. As each group of hashes is pushed onto the stack, it can be authenticated using the previously loaded and authenticated hash values. For example, hashes 1212 can be authenticated by hashing their combination and comparing that value with unsigned root hash 1210. Similarly, hashes 1213 are authenticated by hashing their combination and comparing that value with the appropriate previously-loaded hash value (i.e., hash 1220), and hashes 1215 are authenticated in a similar manner using hash 1218. Finally, the requested portion of content 1204a is authenticated by computing its hash and comparing that value with hash 1222.

Figure 13C:
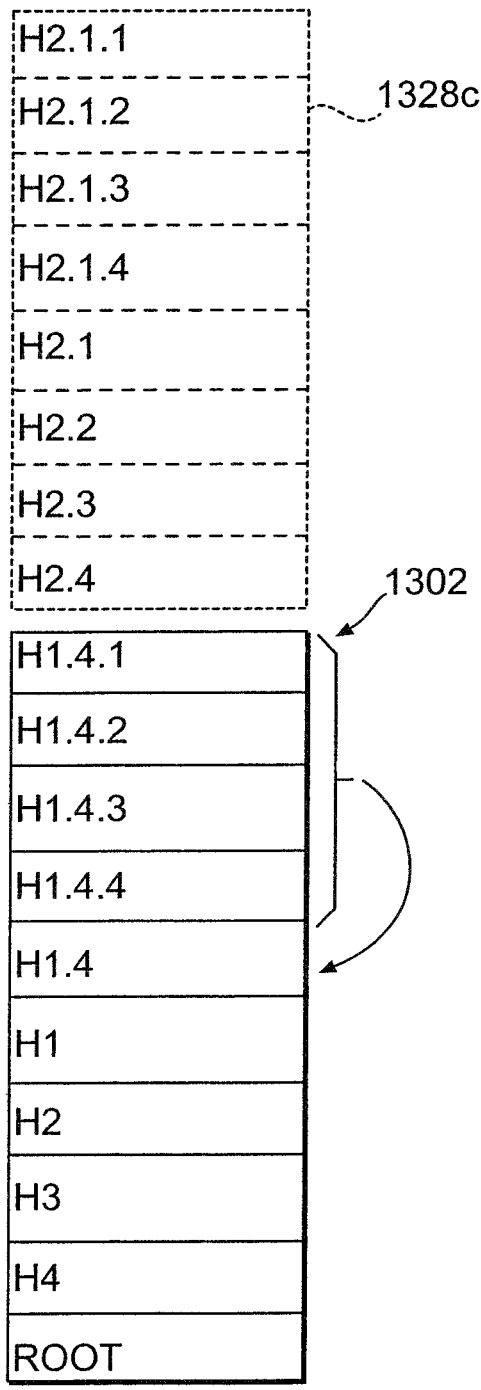
Figure 13D:
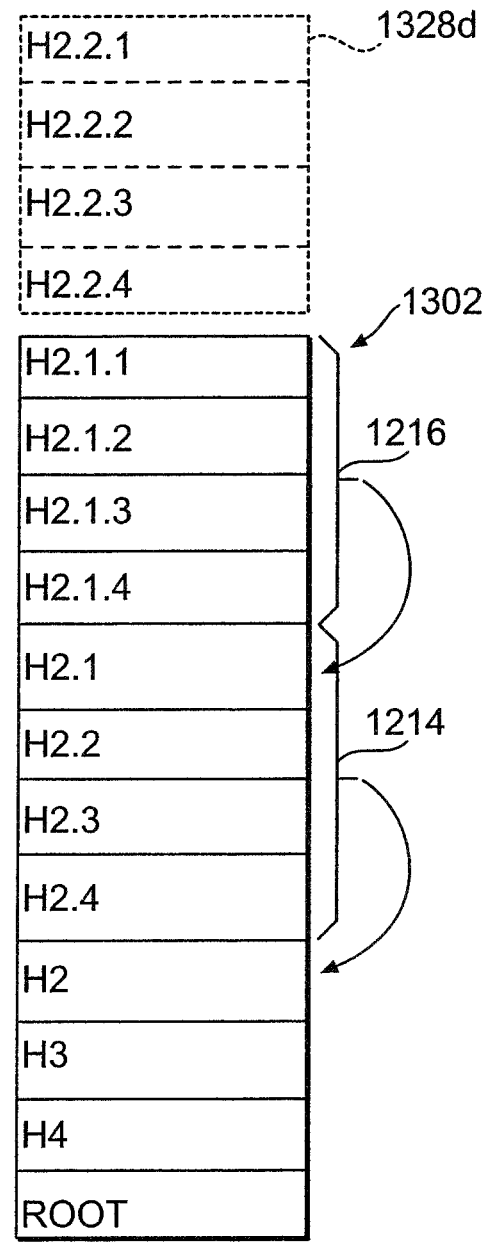

As successive portions of content are accessed (e.g., 1204b, etc.), their hashes are computed and compared with the corresponding authenticated hash values on the stack. As shown in FIGS. 13B, 13C, and 13D, when additional portions of tree 1200 are needed, they can be loaded onto stack 1302 and authenticated, and previously-loaded portions of tree 1200 that are no longer needed can be removed from the stack. For example, as shown in FIG. 13B, when decoding device 204 wishes to access block P1.2.1, hashes 1316 are loaded onto stack 1302 and authenticated against previously-authenticated hash value 1324.

In a preferred embodiment, content blocks are loaded into, e.g., RAM 248 or RAM 290 of the user's system 204 prior to authentication, and after authentication the blocks are released for use directly therefrom. This procedure helps prevent an attacker from substituting unauthentic content for content that has been authenticated, e.g., by overwriting the authenticated content in insecure memory. Thus, in a preferred embodiment the integrity of content is verified (or re-verified) each time it is retrieved from insecure memory for use.

The approach illustrated in FIGS. 12 and 13 can thus provide an efficient balance between the memory and processing requirements of the authentication scheme. In particular, the amount of memory used by this embodiment is about four hashes for each level of the tree (except for the root). Thus, for example, an eight-level hash tree with a branching factor of four could be used to authenticate the content of a DVD containing 7.5 gigabytes of data, the data being divided into 15,000 blocks of 500 kilobytes each. To access and authenticate any given block using the technique illustrated in FIGS. 12 and 13, the root hash and four hash values from each of the other seven levels of the tree would be loaded onto the stack. If a hash function is used that yields 20-byte hashes (e.g., SHA-1), it would only be necessary to have stack storage for 7*4*20+20=580 bytes of hash data (possibly plus a small amount of additional indexing metadata).

In addition, real-time processing requirements can be reduced by pre-authenticating successive portions of the tree in a pipelined fashion. For example, as shown in FIG. 13, the hash values 1328 needed to authenticate the next group of data blocks (and/or the data blocks themselves) can be pre-loaded and authenticated before access to those data blocks is actually needed. In addition, in some applications it may be desirable to authenticate the hash tree before access to any specific portion of the content is actually requested. Thus, for example, selected hash values and the signature can be loaded into memory when a user's system 204 is turned on, or when a specific application is initiated. For instance, in one embodiment when a portable device is turned on, and/or when a CD is inserted into the portable device, the portable device automatically loads and verifies the hash values and the signature(s) that correspond to the content that is deemed most likely to be requested next (e.g., the first track of the CD, the content at the location that was accessed most recently, etc.). In this regard, well-known caching techniques can be used to load and authenticate the hash values and/or tree(s) deemed most likely to be used next.

While FIGS. 12 and 13 illustrate an embodiment in which only those hash groups needed to authenticate a given content block are loaded into secure memory and authenticated, one of ordinary skill in the art will appreciate that a variety of other techniques could be used to implement the hierarchical authentication scheme of the present invention. For example, in another embodiment, the entire hash tree is pre-loaded and authenticated. In this embodiment, the process shown in FIG. 11 is modified by moving blocks 1108 and 1110 so that they fall between blocks 1104 and 1106 (i.e., placing them before the content authentication loop). This technique may be useful in applications where system memory is not a limiting factor, and/or in embodiments where a content file (e.g., a CD or DVD) is mapped onto a plurality of relatively small, authentication trees (e.g., one per track).

FIG. 14 illustrates a process for authenticating the hash values of a tree in an embodiment in which the entire tree is loaded into memory prior to content access. As shown in FIG. 14, level-one root hash 1404 is obtained by unsigning signature 1402, and calculated root hash 1406 is obtained by combining and hashing the level-two hashes 1408. Calculated hash 1406 is then compared with unsigned root hash 1404, and an error handler 1405 is called if the comparison is unsuccessful. If the comparison is successful, then the stored level-two hashes 1408 are deemed to be authentic.

Similarly, each group of level-three hashes 1412 is hashed to yield a calculated level-two hash 1410. Each calculated level-two hash 1410 is compared with its corresponding, stored level-two hash 1408. If any such comparison fails, then the appropriate error handler is called; otherwise, the stored level-three hashes 1412 are deemed to be authentic. As shown in FIG. 14, the verification process continues in this manner until each level of stored hashes has been authenticated.

Once the hash tree has been verified (i.e., once the process shown in FIG. 14 has successfully concluded), the upper layers of the hash tree can be removed from secure memory 290, thereby advantageously conserving space, which in many applications is of limited supply. For example, in one embodiment only the hash values 1012 at the lowest level (i.e., the nth level) of the tree are maintained in secure memory. Since the lower hash values derive their security from having been checked against the root signature (or values derived therefrom), compromise to security is avoided as long as the lower hash values are maintained in secure memory after they have been authenticated. Moreover, since the entire tree preferably remains stored in non-volatile memory 251, ROM 250, and/or disc 280, some or all of the tree is available to be reloaded into secure memory 290 and re-authenticated if the need arises.

Figure 15A:
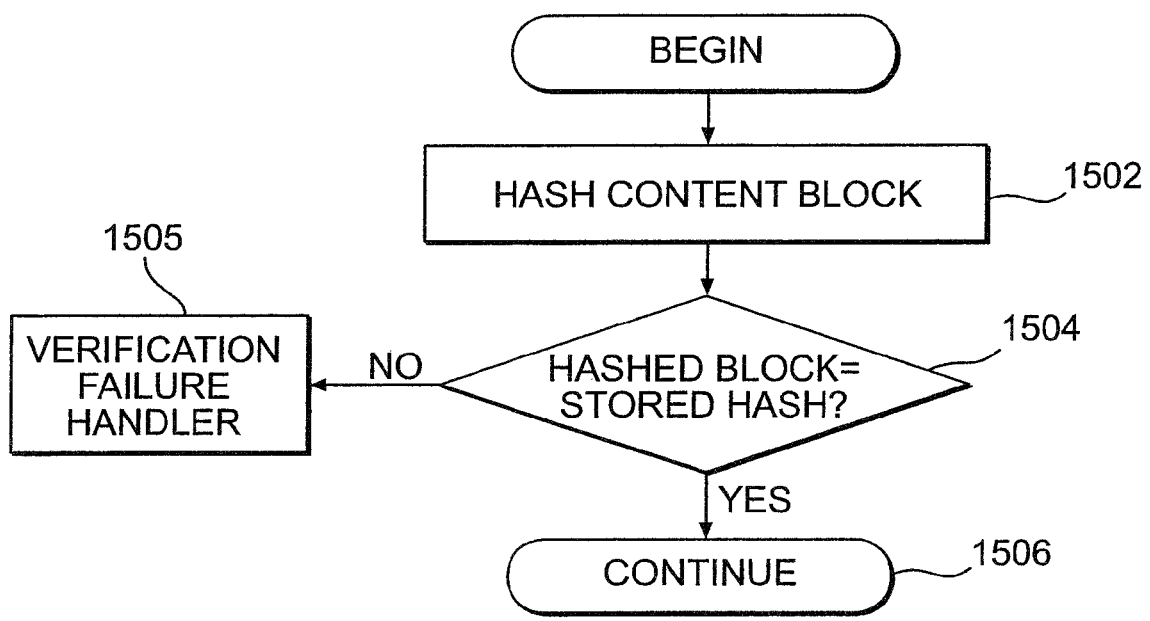
FIGS. 15A and 15B are flow charts of methods for authenticating blocks of data in accordance with embodiments of the present invention.

The process of authenticating a block of content (e.g., block 1112 in FIG. 11) will now be described in more detail with reference to FIGS. 15A and 15B. FIG. 15A illustrates the authentication process for an embodiment such as that shown in FIGS. 12 and 13 in which the hashes from the lowest level of the tree (i.e., the nth level) are stored in secure memory 290. As shown in FIG. 15A, a block of content is authenticated by computing its hash (1502), and comparing it with the corresponding hash stored in memory (1504). If the computed hash is equal to the stored (and previously authenticated) hash, then the content is deemed to be authentic; otherwise, appropriate defensive measures are taken (1505).

As previously discussed, any suitable defensive measure(s) could be used. For example, in one embodiment further access to the content (or at least the unauthentic block) is denied. Alternatively (or in addition), an error handling routine could be called (1505) to determine (e.g., based on the frequency, number, or pattern of errors) whether to permit access to the block despite its failure to authenticate, or whether to prevent or terminate access to the block instead. For example, if the block size is small enough that allowing a certain level of unauthentic content to be used would not unduly compromise the interests being protected by the authentication scheme, then allowing use to proceed despite the detection of some errors may be desirable. On the other hand, if absolute integrity is required—e.g., as might be the case with an important applet or other executable program, where single bit errors could disrupt or modify the program's operation—then the error handler will preferably prevent access to, or execution of, the file if the authentication of any block fails.

Figure 15B:
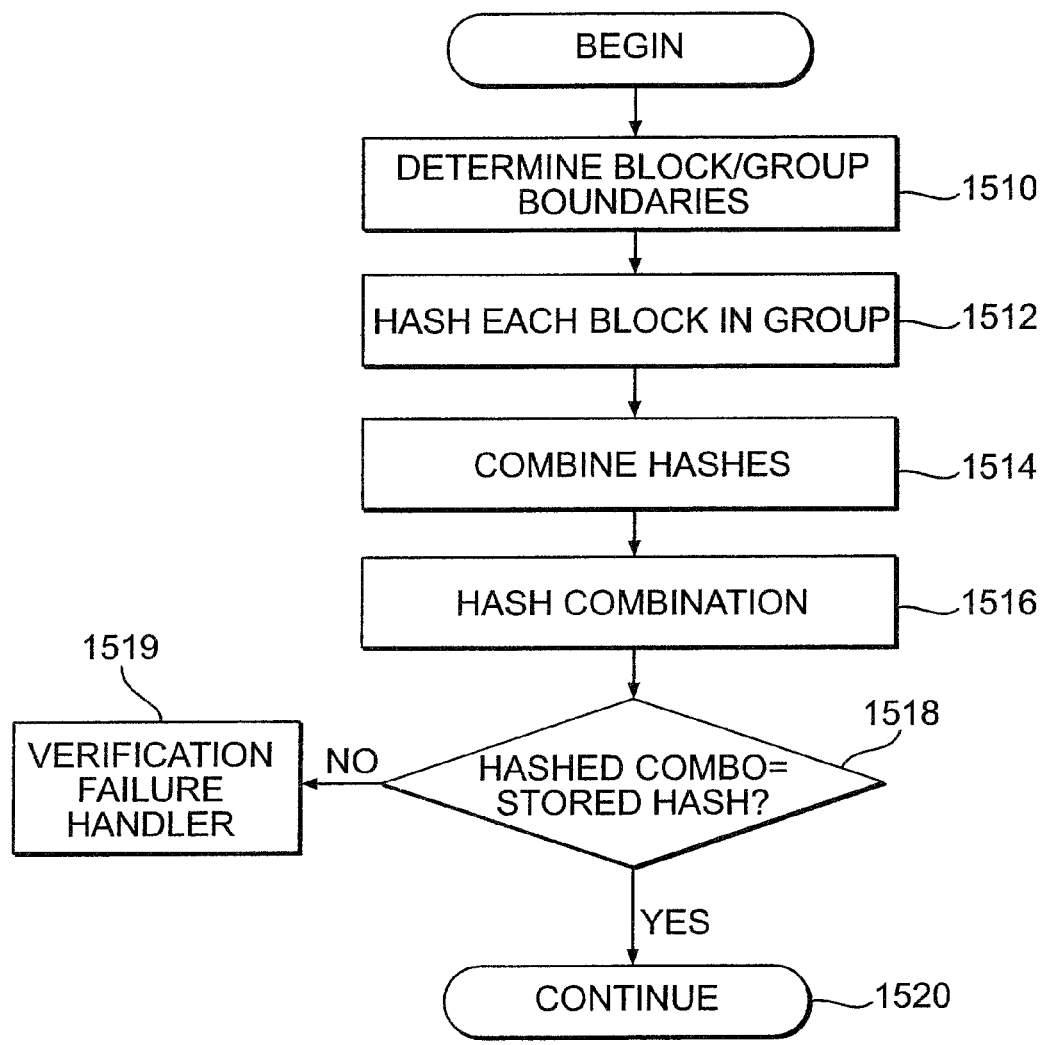

FIG. 15B illustrates the process of authenticating a block of content in an embodiment in which the lowest level of the hash tree that is stored in memory 290 is the next-to-last level (i.e., the (n−1)st level). As shown in FIG. 15B, in such an embodiment it will generally be necessary to construct the lower portion of the hash tree, the root of which can be compared to a hash from the lowest level stored in memory. In general, this process is quite similar to the process shown in FIG. 14 for verifying the integrity of a hash tree. Thus, referring to FIG. 15B, when access to a particular piece of content is requested, a content segment that includes the beginning of the requested piece is first loaded and partitioned (logically or physically) into blocks (1510). The hash of each such block is computed (1512), the hashes are combined (1514), and the hash of the combination is computed (1516). The result is compared with the appropriate (n−1)st level hash stored in memory (1518). If the computed hash is equal to the stored hash, then the content is deemed to be authentic; otherwise, appropriate defensive measures are taken (1519). One of ordinary skill in the art will appreciate that the process shown in FIG. 15B can be readily adapted to embodiments in which the hash values from a different level (e.g., the (n−2)nd level, etc.) of the hash tree are stored in memory.

As FIGS. 15A and 15B illustrate, the granularity of the random-access verification scheme is effectively determined by the level of the hash values that are stored in memory. For example, if, as in FIG. 15A, hashes from the lowest level of the tree are authenticated and stored in memory, then content can be authenticated directly on a block-by-block basis. If, on the other hand, the next-to-lowest level of hashes are stored in memory—as in FIG. 15B—then content is authenticated four blocks at a time (i.e., by an amount of blocks equal to the branching factor used in the tree). In a limiting case, where only the root signature of the tree is stored in memory, the authentication granularity would be the size of the file itself.

Note, however, that the granularity of the authentication scheme need not limit the granularity of the actual access that is allowed. The authentication granularity simply relates to the amount of computation that is performed by the authentication scheme before content is released. For example, a portable device may allow the user to jump to an arbitrary point within a content file, irrespective of the granularity of the authentication scheme; however, the granularity of the authentication scheme would dictate the amount of computation needed to authenticate the content before it was released.

Thus it can be seen that there will typically be some tradeoff between the amount of computational resources and the amount of memory required by the authentication scheme. At one extreme, where only the root of the tree is maintained in memory, the memory requirements are relatively low (e.g., the size of a signature or hash), while the dynamic computation requirements are relatively high, as the entire hash tree must be computed dynamically before any given piece of content is released. At the other extreme (and in one preferred embodiment), dynamic computation requirements are minimized by storing hashes from the lowest level of the tree in secure memory, thus allowing any given content block to be authenticated simply by computing a hash and performing a comparison. Since the hash values are typically small in comparison with the size of the content blocks from which they are derived, the space consumed by the tree will usually be relatively small. For example, if the hash of a 512-byte content block is 20 bytes, and a tree is constructed for 1024 content blocks (i.e., approximately 500 kilobytes of data), the amount of dynamic memory needed to store the relevant hash values would only be about 420 bytes if the approach shown in FIGS. 12 and 13 were used, or 20 kilobytes if the approach described in connection with FIG. 14 were used (assuming a uniform branching factor of four). It will be appreciated, however, that for purposes of practicing the present invention other suitable balances between memory and processing requirements could be struck.

Although the foregoing invention has been described in some detail for purposes of clarity of understanding, it will be apparent that certain changes and modifications may be practiced within the scope of the appended claims. It is emphasized that there are many alternative ways of implementing both the processes and apparatuses of the present invention. Accordingly, the present embodiments are to be considered illustrative and not restrictive, and the invention is not to be limited to the details given herein, but may be modified within the scope and equivalents of the appended claims.

What is claimed is:

1. A method for encoding and transmitting a digital file in a manner designed to facilitate authentication of a streaming transmission of the digital file, the method being performed by a system comprising a processor and a non-transitory computer-readable storage medium storing instructions that when executed by the processor, cause the processor to perform the method, the method comprising:

generating a progression of check values, each check value in the progression being derived from at least one other check value in the progression and from a portion of the digital file;

encrypting a final check value in the progression of check values, wherein the final check value corresponds to the beginning portion of the digital file;

inserting the encrypted final check value in proximity to the beginning of the streamed transmission of the digital file; and transmitting the digital file and the progression of check values to a user's system, whereby the user's system is configured to receive parts of the digital file and to use one or more received check values to authenticate the parts of the digital file before the entire digital file is received.

2. The method of claim 1, wherein the portion of the digital file comprises error-check values, each error-check value being inserted in proximity to a part of the digital file to which said error-check value corresponds, each error-check value being configured to facilitate authentication of a part of the digital file and a check value in the progression of check values.

3. The method of claim 1 further, wherein each error-check value comprises a hash of the part of the digital file to which the error-check value corresponds.

4. A non-transitory computer-readable storage medium storing instructions that, when executed by a processor, are configured to cause the processor to perform a method for encoding a data block in a manner designed to facilitate authentication of a streamed transmission of the data block, the method comprising:

generating a progression of data check values, wherein each data check value is derived, at least in part, from at least one other data check value in the progression and a hash of a portion of the data block;

encrypting a final check value in the progression of check values, wherein the final check value corresponds to the beginning portion of the digital file;

inserting the encrypted final check value in proximity to the beginning of the streamed transmission of the digital file; and encoding the data block by inserting a plurality of error-check values into the data block, each error-check value being inserted in proximity to a part of the data block to which the error-check value corresponds, and each error-check value being operable to facilitate authentication of part of the data block and of a data check value in the progression of data check values.

5. The non-transitory computer-readable storage medium of claim 4, wherein the method further comprises:

sending the streamed transmission of the encoded data block to a user's system, the user's system being configured to receive and authenticate portions of the streamed transmission before the entire encoded data block is received.

6. The non-transitory computer-readable storage medium of claim 4, wherein the at least one error-check value comprises a hash of the part of the data block to which the error-check value corresponds.

7. The non-transitory computer-readable storage medium of claim 4, wherein the method further comprises:

digitally signing at least a root data check value in the progression of data check values.

8. The non-transitory computer-readable storage medium of claim 4, wherein the computer-readable storage medium is selected from the group consisting of: CD-ROM, DVD, MINIDISC, floppy disk, magnetic tape, flash memory, ROM, RAM, system memory, hard drive, and optical storage.

9. The non-transitory computer-readable storage medium of claim 4, wherein at least one error-check value comprises a hash of a combination of at least one other error-check value and a hash of a portion of the data block.

* * * * *